(12) United States Patent
Yasui et al.

(10) Patent No.: US 7,267,103 B2
(45) Date of Patent: Sep. 11, 2007

(54) IGNITION TIMING CONTROL SYSTEM FOR INTERNAL COMBUSTION ENGINE

(75) Inventors: Yuji Yasui, Saitama-ken (JP); Koichiro Shinozaki, Saitama-ken (JP); Masahiro Sato, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/268,705

(22) Filed: Nov. 8, 2005

(65) Prior Publication Data

US 2006/0112933 A1    Jun. 1, 2006

(30) Foreign Application Priority Data

Nov. 26, 2004    (JP)    ............... 2004/341906

(51) Int. Cl.
  *F02P 5/153*    (2006.01)
(52) U.S. Cl. ............... 123/406.41; 123/406.42; 123/406.43
(58) Field of Classification Search ........... 123/406.41, 123/406.42, 406.43
  See application file for complete search history.

(56) References Cited

U.S. PATENT DOCUMENTS 4,598,680 A * 7/1986 Lanfer ............... 123/406.23
7,073,485 B2 * 7/2006 Truscott et al. ........ 123/406.22

* cited by examiner

*Primary Examiner*—Erick Solis
(74) *Attorney, Agent, or Firm*—Arent Fox LLP

(57) ABSTRACT

An ignition timing control system for internal combustion engines, which is capable of preventing occurrence of variation in engine speed and vibrations which can be caused due to variation in combustion state between the cylinders, to thereby improve drivability. The ECU 2 of the ignition timing control system 1 calculates a statistically processed value $Pmi\_ls\#i$ according to the in-cylinder pressure $Pcyl\#i$, and calculates an averaging target value $Piav\_cmd$ by weighted averaging of a minimum value $Pmi\_ls\_min1$ and a second minimum value $Pmi\_ls\_min2$ within a predetermined range of the statistically processed value. The ECU 2 calculates a correction value $DIGCMP\#i$ by performing a limiting process for setting the optimization correction value $DIGOP\#i$ for control of the ignition timing to a limit value on the advanced side, on the averaging correction value $DIGPIAV\#i$ for causing the statistically processed values $Pmi\_ls\#i$ to follow the averaging target value $Piav\_cmd$, such that the statistically processed values $Pmi\_ls\#i$ becomes maximum. The ignition timing $IGLOG\#i$ is calculated for each cylinder based on the correction value $DIGCMP\#i$.

7 Claims, 13 Drawing Sheets

F I G. 8
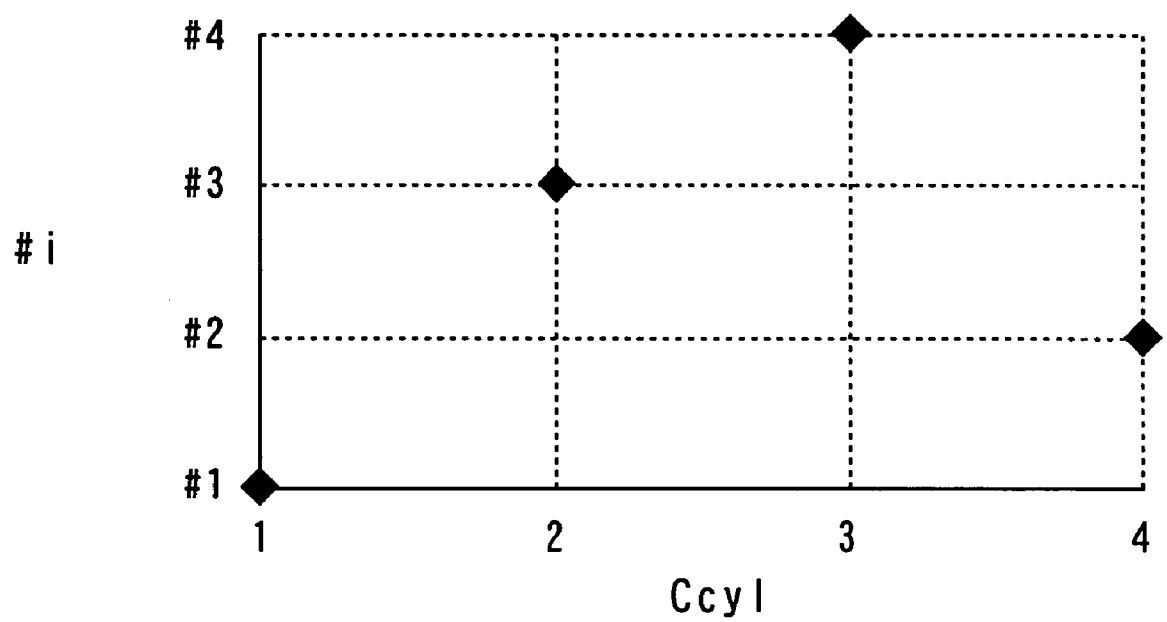

IGNITION TIMING CONTROL SYSTEM FOR INTERNAL COMBUSTION ENGINE

BACKGROUND OF THE INVENTION

1. Field of the Invention

The present invention relates to an ignition timing control system for an internal combustion engine, which controls ignition timing of the engine according to the in-cylinder pressure.

2. Description of the Related Art

Conventionally, an ignition timing control system for an internal combustion engine, which controls the ignition timing of the engine using the in-cylinder pressure thereof has been proposed e.g. in Japanese Laid-Open Patent Publication (Kokai) No. 2003-262177. This ignition timing control system calculates the difference between the maximum value of the in-cylinder pressure detected by the in-cylinder pressure sensor and the value of the same at the top dead center position of the compression stroke, and when the difference is smaller than a predetermined threshold value, the ignition timing is determined to be too retarded, so that the ignition timing is controlled to be advanced by a predetermined value. In the other cases, the ignition timing is held at the value used at the time.

In general, the internal combustion engine sometimes experiences variation in combustion state between the cylinders thereof (i.e. variation in heat energy generated by combustion), and in such a case, generated torque varies between the cylinders, which causes variation in the engine speed and vibrations, resulting in degraded drivability. Further, when the engine is used as a power source of a vehicle, there is a fear of occurrence of surging. Variation in combustion state between the cylinders is more likely to occur when variable valve lift mechanisms are provided for respective cylinders, for continuously changing the respective lifts of intake valves associated therewith, due to differences in the play and operating characteristics of the variable valve lift mechanism, which vary from one cylinder to another.

In contrast, the ignition timing control system proposed by Japanese Laid-Open Patent Publication (Kokai) No. 2003-262177 controls the ignition timing without considering the above-mentioned variation in combustion state between the cylinders, and hence can give rise to degradation of drivability and occurrence of surging. This problem is more likely to become conspicuous particularly when the system is applied to internal combustion engines equipped with the variable valve lift mechanism.

SUMMARY OF THE INVENTION

The present invention has been made to provide a solution to the above-described problems, and an object thereof is to provide an ignition timing control system for internal combustion engines, which is capable of preventing variations in engine speed and occurrence of vibrations which can be caused due to variation in combustion state between the cylinders, to thereby improve drivability.

To attain the above object, the present invention provides an ignition timing control system for an internal combustion engine, comprising in-cylinder pressure-detecting means for detecting pressures in a plurality of cylinders as a plurality of in-cylinder pressures, respectively, work-done-amount parameter-calculating means for calculating a plurality of work-done-amount parameters indicative of amounts of work done in combustion in the cylinders, according to the detected in-cylinder pressures, respectively, target value-calculating means for setting one of the calculated work-done-amount parameters to a reference value of the work-done-amount parameters, and calculating one target value as a target of the work-done-amount parameters, according to the reference value, and ignition timing-determining means for determining ignition timings of the cylinders, respectively, such that the work-done-amount parameters follow the one target value.

According to this ignition timing control system, the respective ignition timings of the cylinders are controlled such that the work-done-amount parameters follow one target value. In this case, the work-done-amount parameters represent respective amounts of work done in combustion in the cylinders, so that the ignition timing can be controlled such that variation in the combustion state (that is, variation in heat generated by combustion) between the cylinders is eliminated. This makes it possible to avoid variation in the engine speed and vibrations from being caused by variation in the combustion state between the cylinders. Further, one target value is calculated not irrespective of the work-done-amount parameters but according to one them, and hence it is possible to prevent the one target value from largely deviating from all the work-done-amount parameters, thereby enabling the follow-up property of the work-done-amount parameters to the one target value to be enhanced, and prevent occurrence of variation in engine speed and other inconveniences. This makes it possible to enhance drivability. The above-described advantages can be obtained more effectively, especially when the ignition timing control system is applied to an internal combustion engine in which variation in the combustion state is liable to be caused due to the provision of the variable valve lift mechanism.

Preferably, the reference value is set to a minimum value of the work-done-amount parameters.

With this configuration of the preferred embodiment, the reference value is set to a minimum value of the work-done-amount parameters, and therefore, one target value as a target of the work-done-amount parameters is calculated according to the minimum value, and the respective ignition timings of the cylinders are determined such that the work-done-amount parameters follow the one target value. This makes it possible to cause all the work-done-amount parameters including the work-done-amount parameter having the minimum value to positively follow the one target value. As a result, for example, when the work-done-amount parameter of one cylinder shows the minimum value due to variation between individual cylinders and aging, the unattainable amount of work to be done by such a cylinder, which cannot be attained, cease to be demanded, whereby it is possible to positively prevent variation in combustion state between the cylinders. Thus, drivability can be further enhanced.

Preferably, the reference value is set to a minimum value of work-done-amount parameters within a range defined between the maximum value of the work-done-amount parameters as an upper limit and a value of the work-done-amount parameters smaller than the maximum value by a predetermined value, as a lower limit.

In general, in the internal combustion engine having a plurality of cylinders, when a cylinder exists which is much more degraded in combustion state than the other cylinders, due to sludge, if the ignition timing control is carried out with reference to the cylinder such that the other cylinders are adjusted thereto in respect of combustion state, cylinders whose combustion state is excellent are too retarded in ignition timing, which causes an increase in temperature of exhaust gases and misfires, causing damage to the exhaust system and a catalyst arranged therein. With the configuration of the preferred embodiment, however, the reference value is set to a minimum value of work-done-amount parameters within a range defined between the maximum value of the work-done-amount parameters as an upper limit and a value of the work-done-amount parameters smaller than the maximum value by a predetermined value, as a lower limit, and the one target value of the work-done-amount parameters is calculated according to the minimum value. Therefore, when the minimum value of the work-done-amount parameters is lower than the maximum value by more than the predetermined value, that is, even when there exists a cylinder having combustion state thereof much more degraded than the other cylinders, the ignition timing can be controlled with reference to the cylinder which is different in the value of the work-done-amount parameter from the maximum value by not more than the predetermined value, such that the variation in the combustion state is eliminated. As a result, it is possible to prevent an increase in the temperature of exhaust gases and occurrence of misfires, thereby making it possible to prevent the exhaust system and the catalyst from being damaged.

Preferably, the work-done-amount parameter-calculating means calculates unprocessed values of the work-done-amount parameters according to the in-cylinder pressures, respectively, and performing a predetermined sequential statistical process on the unprocessed values, to thereby calculate the work-done-amount parameters.

In general, the in-cylinder pressure undergoes variation in such a manner as can be described by the probability theory, and therefore, if the detected in-cylinder pressure is directly used, the work-done-amount parameter calculated based thereon exhibits a value containing noise caused by the variation. As a result, if the ignition timing is controlled by using such work-done-amount parameters, the accuracy of control of the ignition timing can be degraded. With the configuration of the preferred embodiment, however, the work-done-amount parameters are calculated by performing the predetermined sequential statistical process on the unprocessed values of the work-done-amount parameters calculated according to the respective in-cylinder pressures of the cylinders, and hence can be calculated as values which are difficult to be adversely affected by the variation in the in-cylinder pressure, that is, a value in which adverse influence of noise caused by the variation is suppressed, and it is possible to control the ignition timing using the work-done-amount parameters thus calculated. Consequently, the adverse influence of noise caused by the variation in the in-cylinder pressure can be suppressed, thereby making it possible to enhance the accuracy of control of the ignition timing.

Preferably, the ignition timing-determining means comprises first control value-calculating means for calculating a first control value for control of the ignition timing of each of the cylinders, such that in each cylinder, the work-done-amount parameter of the cylinder becomes maximum, second control value-calculating means for calculating a second control value for control of each of the cylinders, such that in each cylinder, the work-done-amount parameter of the cylinder follows the one target value, final control value-calculating means for calculating a final control value by performing a limiting process which sets the first control value to a limit value on an advanced side, on the second control value, and ignition timing-calculating means for calculating the ignition timing for each of the cylinders according to the calculated final control value.

With the configuration of the preferred embodiment, a first control value is calculated as a value for control of the ignition timing of each of the cylinders, such that in each of the cylinders, the work-done-amount parameter of each cylinder becomes maximum, and a second control value is calculated as a value for control of each of the cylinders, such that in each cylinder, the work-done-amount parameter of the cylinder follows the one target value. A final control value is calculated by performing a limiting process which sets the first control value to a limit value on the advanced side, on the second control value, and the ignition timing of each of the cylinders is calculated according to the calculated final control value. Thus, the final control value is calculated by performing the limiting process which sets the first control value to the limit value on the advanced side on the second control value, and therefore, differently from the case where the ignition timing control for maximizing the work-done-amount and the ignition timing control for causing the work-done-amount parameters to follow the one target value are simultaneously carried out in each cylinder, it is possible to prevent the interaction between the two ignition timing control processes, and smoothly switch the final control value from the second control value to the first control value. This makes it possible to avoid occurrence of a torque step to thereby enhance drivability. Further, for the same reason, even when the second control value is set to a more advanced value than the first control value in any of the cylinders, the final control value for the cylinder is limited to the first control value, whereby the ignition timing is calculated based on the first control value, which makes it possible to maximize the work-done-amount parameter. In short, highest combustion efficiency can be ensured, thereby making it possible to further enhance drivability.

More preferably, the target value-calculating means calculates the one target value by weighted averaging of the reference value and a value larger than the reference value of the work-done-amount parameters.

With this configuration of the preferred embodiment, the one target value is calculated by weighted averaging of the reference value and a value larger than the reference value of the work-done-amount parameters, whereby it is calculates as a value larger than the reference value. Therefore, in the cylinder whose work-done-amount parameter is set to the reference value, there is a higher possibility that the final control value is set to the first control value, and the ignition timing is controlled to maximize the work-done-amount parameter. As a result, in the cylinder associated with the reference value, the ignition timing is controlled to maximize the work-done-amount parameter, which makes it possible to enhance the combustion efficiency of the whole engine. Particularly, as in the second-mentioned preferred embodiment, when the reference value is set to the minimum value of work-done-amount parameters within the range defined between the maximum value of the work-done-amount parameters as the upper limit and the value of the work-done-amount parameters smaller than the maximum value by the predetermined value, as the lower limit, in addition to the cylinder associated with the reference value, also in cylinders in which the work-done-amount parameters are smaller than the reference value, the ignition timing is controlled such that the work-done-amount parameters become maximum, which makes it possible to more effectively enhance the combustion efficiency of the whole engine.

More preferably, the ignition timing-determining means comprises first control value-calculating means for calculating a first control value for control of the ignition timing of each of the cylinders, such that in each cylinder, the work-done-amount parameter of the cylinder becomes maximum, second control value-calculating means for calculating a second control value for control of each of the cylinders, such that in each cylinder, the work-done-amount parameter of the cylinder follows the one target value, and ignition timing-calculating means for calculating ignition timings of ones of the cylinders, of which work-done-amount parameters are not larger than the reference value, according to the first control value, and ignition timings of ones of the cylinders, of which work-done-amount parameters are larger than the reference value, according to the second control value.

With the configuration of the preferred embodiment, the first control value is calculated as a value for control of the ignition timing of each of the cylinders, such that in each cylinder, the work-done-amount parameter of the cylinders becomes maximum, and the second control value is calculated as a value for control of each of the cylinders, such that in each cylinder, the work-done-amount parameter of the cylinder follows the one target value. The ignition timings of ones of the cylinders, of which work-done-amount parameters are not larger than the reference value, are calculated according to the first control value, and ignition timings of ones of the cylinders, of which the work-done-amount parameters are larger than the reference value, are calculated according to the second control value. By thus calculating the ignition timing, the cylinders of which the work-done-amount parameters are not larger than the reference value are controlled such that the work-done-amount parameters thereof become maximum, and the cylinders of which the work-done-amount parameters are larger than the reference value are controlled such that the work-done-amount parameters thereof follow the one target value. This makes it possible, even when there exists a cylinder whose combustion state is much more degraded than the cylinder associated with the referenced value, it is possible to secure the maximum value for the work-done-amount parameter in the cylinder, and in the cylinders of which the work-done-amount parameters are equal to the reference value or larger than the reference value, it is possible to secure work-done-amount parameters corresponding to the maximum value of the work-done-amount parameter of the cylinder associated with the reference value while eliminating variation in combustion state between the cylinders. As a result, the combustion efficiency of the whole engine can be more effectively enhanced.

More preferably, the second control value-calculating means calculates the second control value according to a control algorithm including a two-degree-of-freedom control algorithm in which a predetermined target value filter algorithm and a predetermined follow-up control algorithm are combined.

The second control value is a value for controlling the ignition timing of each cylinder such that each work-done-amount parameter follows the one target value, and hence when a cylinder for which the reference value of the work-done-amount parameter is set is switched due to a change in the operating condition of the engine, the one target value can be suddenly changed to suddenly change the second control value as well. In view of this, according to the ignition timing control system, the second control value is calculated with the control algorithm including the two-degree-of-freedom control algorithm in which a predetermined target value filter algorithm and a predetermined follow-up control algorithm are combined. Therefore, by properly setting the filter characteristics of the target value filter algorithm, even when the one target value is suddenly changed, it is possible to avoid a sudden change in the second control value. This makes it possible to avoid occurrence of a torque step caused by the sudden change in the second control value, thereby making it possible to further enhance drivability.

The above and other objects, features, and advantages of the present invention will become more apparent from the following detailed description taken in conjunction with the accompanying drawings.

BRIEF DESCRIPTION OF THE DRAWINGS

FIG. 8 is a diagram showing a table for use in setting a cylinder number value #i, by way of example;

DETAILED DESCRIPTION OF PREFERRED EMBODIMENTS

Figure 2:
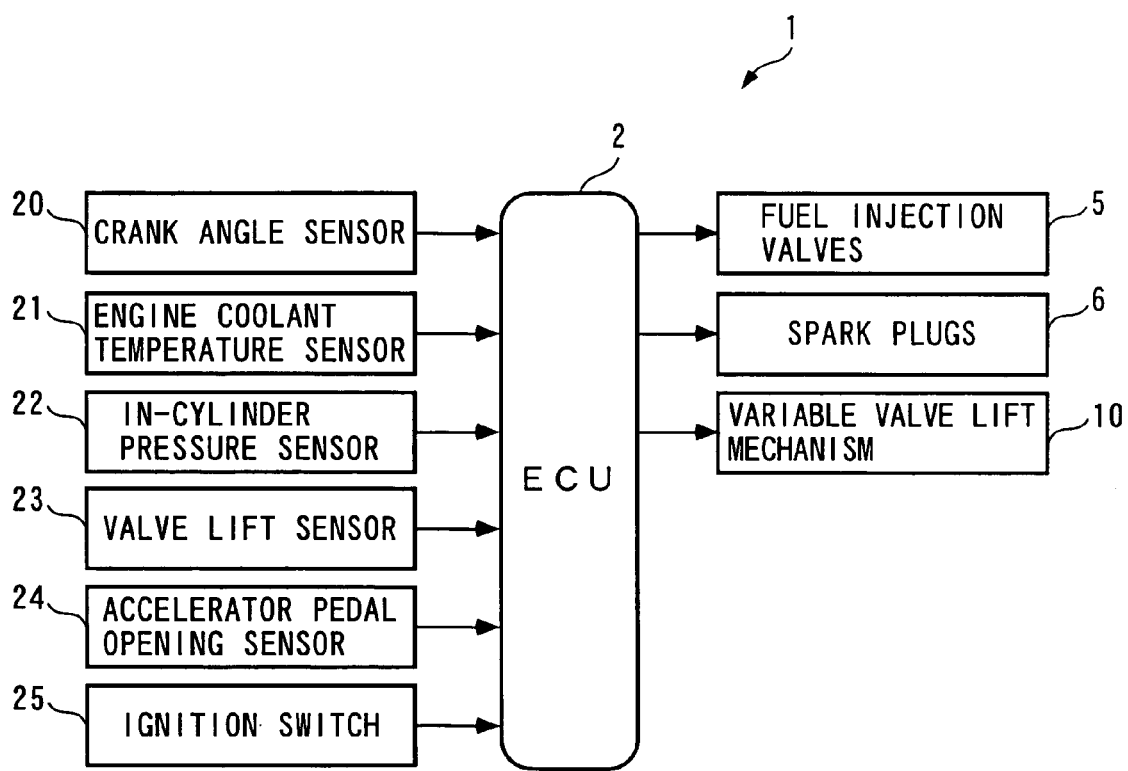
FIG. 2 is a schematic view of the ignition timing control system.

Hereafter, an ignition timing control system according an embodiment of the present invention will be described with reference to the drawings. The ignition timing control system 1 includes an ECU 2, as shown in FIG. 2. As described hereinafter, the ECU 2 carries out control processes, including an ignition timing control process, depending on operating conditions of an internal combustion engine (hereinafter simply referred to as "the engine") 3.

Figure 1:
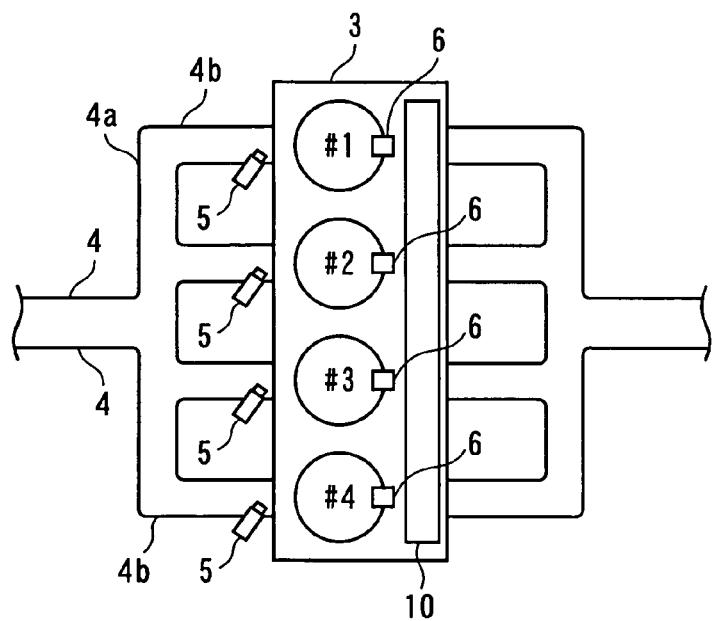
FIG. 1 is a schematic view of an internal combustion engine to which is applied an ignition timing control system according to an embodiment of the present invention.

Referring to FIG. 1, the engine 3 is an in-line four-cylinder gasoline engine installed on a vehicle, not shown, and includes first to fourth cylinders #1 to #4 (a plurality of cylinders). The engine 3 has an intake pipe 4 connected to the four cylinders #1 to #4 via four branch portions 4b of an intake manifold 4a.

In the branch portions 4b, fuel injection valves 5 are inserted at respective locations upstream of intake ports, not shown, for the cylinders. During operation of the engine 3, each fuel injection valve 5 is controlled in respect of a valve-opening time period and valve-opening timing thereof by a drive signal delivered from the ECU 2. Thus, fuel injection control is carried out.

Spark plugs 6 are mounted through a cylinder head of the engine 3 on a cylinder-by-cylinder basis. Each spark plug 6 is connected to the ECU 2 via an ignition coil, not shown. When a drive signal (voltage signal) from the ECU 2 is applied in timing corresponding to ignition timing IGLOG, referred to hereinafter, the spark plug 6 causes a spark discharge, thereby burning a mixture in a combustion chamber associated therewith.

The engine 3 is provided with a variable valve lift mechanism 10. The variable valve lift mechanism 10 continuously changes the lift Liftin of each of an intake valve, not shown, (hereinafter referred to as "the valve lift Liftin") within a predetermine range, to thereby continuously change the amount of intake air (intake air amount). The variable valve lift mechanism 10 is configured similarly to a variable valve lift mechanism proposed by the present assignee in Japanese Patent Application No. 2004-249213, although detailed description of thereof is omitted here. The variable valve lift mechanism 10 is electrically connected to the ECU 2, and driven by a lift control input Uliftin, referred to hereinafter, from the ECU 2, thereby changing the valve lift Liftin. It should be noted that in the present embodiment, the valve lift Liftin represents the maximum lift of the intake valve 4.

On the other hand, as shown in FIG. 2, to the ECU 2 are connected a crank angle sensor 20, an engine coolant temperature sensor 21, in-cylinder pressure sensors 22, a valve lift sensor 23, an accelerator pedal opening sensor 24, and an ignition switch (hereinafter referred to as "the IG•SW") 25.

The crank angle sensor 20 delivers a CRK signal and a TDC signal, which are both pulse signals, to the ECU 2 in accordance with rotation of a crankshaft (not shown). Each pulse of the CRK signal is generated whenever the crankshaft rotates through a predetermined angle (1° in the present embodiment). The ECU 2 determines the rotational speed NE of the engine 3 (hereinafter referred to as "the engine speed NE") based on the CRK signal. Further, the TDC signal indicates that each piston in the associated cylinder is in a predetermined crank angle position slightly before the TDC position at the start of the intake stroke, and each pulse of the TDC signal is generated whenever the crankshaft rotates through a predetermined crank angle.

The engine coolant temperature sensor 21 is implemented e.g. by a thermistor mounted in a cylinder block (not shown) of the engine 3, and detects an engine coolant temperature TW, which is the temperature of an engine coolant circulating through the cylinder block, and delivers a signal indicative of the sensed engine coolant temperature TW to the ECU 2.

The in-cylinder pressure sensors 22 (in-cylinder pressure-detecting means) are of a piezoelectric element type integrally formed with an associated one of the spark plugs 6, and are provided on a cylinder-by-cylinder basis (only one of which is shown). The in-cylinder pressure sensor 22 is bent with a change in pressure in each cylinder, that is, in-cylinder pressure Pcyl#i, thereby detecting the in-cylinder pressure Pcyl#i to deliver a signal indicative of the sensed in-cylinder pressure Pcyl#i to the ECU 2. It should be noted that the suffix #i (=#1 to #4) in the in-cylinder pressure Pcyl#i is a cylinder number indicative of a number assigned to each cylinder. For example, in-cylinder pressure Pcyl#1 corresponds to in-cylinder pressure in the first cylinder #1. This also applies to various parameters, referred to hereinafter.

Further, the valve lift sensor 23 detects the valve lift Liftin of the intake valves, and delivers a signal indicative of the sensed valve lift Liftin to the ECU 2. The accelerator pedal opening sensor 24 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG•SW 25 is turned on or off by operation of an ignition key, not shown, and delivers a signal indicative of the ON/OFF state thereof to the ECU 2.

The ECU 2 is implemented by a microcomputer including a CPU, a RAM, a ROM, and an I/O interface (none of which are shown). The ECU 2 determines operating conditions of the engine 3, based on the detection signals delivered from the above-mentioned sensors 20 to 24, the ON/OFF signal from the IG•SW 25, and so forth, and executes the control processes including the ignition timing control process, as described hereinafter.

It should be noted that in the present embodiment, the ECU 2 corresponds to work-done-amount parameter-calculating means, target value-calculating means, ignition timing-determining means, first control value-calculating means, second control value-calculating means, final control value-calculating means, and ignition timing-calculating means.

Figure 3:
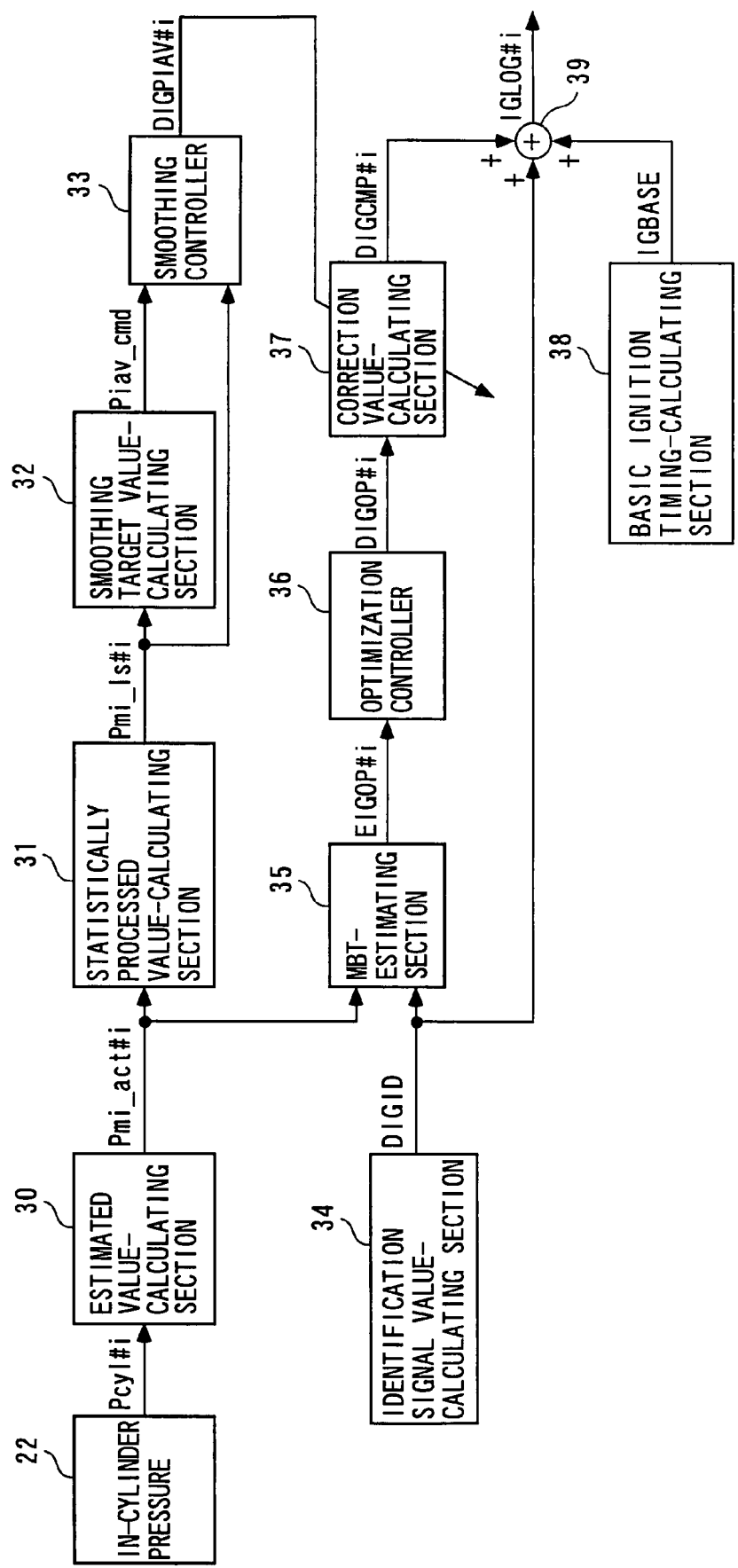
FIG. 3 is a block diagram useful in explaining the configuration of the ignition timing control system.

Next, an ignition timing control system 1 according to the present embodiment will be described with reference to FIG. 3. As shown in FIG. 3, the ignition timing control system 1 is comprised of an estimated value-calculating section 30, a statistically processed value-calculating section 31, a smoothing target value-calculating section 32, a smoothing controller 33, an identification signal value-calculating section 34, an MBT-estimating section 35, an optimization controller 36, a correction value-calculating section 37, a basic ignition timing-calculating section 38, and an adder 39, all of which are implemented by the ECU 2. The ignition timing control system 1 calculates ignition timing IGLOG•0 i, as described hereafter.

First, the estimated value-calculating section 30 calculates an estimated value Pmi_act•0 i of an indicated mean effective pressure (hereinafter simply referred to as "the estimated value Pmi_act•0 i") by a spectral factorization method. Since the spectral factorization method has already been proposed by the present assignee in Japanese Patent Application No. 2004-232633, detailed description of thereof is omitted here. In the spectral factorization method, the estimated value Pmi_act•i is calculated by the following equation (1) based on the in-cylinder pressure Pcyl•i detected by the in-cylinder pressure sensor 22.

$$\text{Pmi\_act}\#i(k) = \frac{1}{V_s}\sum_{n=0}^{N-1} PF\#i(n)\{VF\#i(n) - VF\#i(n-1)\} \quad (1)$$

In the above equation, Vs represents a piston displacement of the engine 3, and PF•i and VF•i represent values obtained by performing a predetermined low-pass filtering process on the in-cylinder pressure Pcyl•i and displacement data V•i of each cylinder, respectively. Further, data with a symbol (n) indicates that it is discrete data sampled (or calculated) in synchronism with generation of the CRK signal. The symbol n indicates a position in the sequence of sampling cycles of respective discrete data. For example, the symbol n indicates that discrete data therewith is a value sampled in the current control timing, and a symbol n−1 indicates that discrete data therewith is a value sampled in the immediately preceding control timing. Furthermore, the symbol N indicates the number of data (a value of 720 in the present embodiment) sampled in one combustion cycle of the engine. Further, discrete data with a symbol (k) indicates that it is data sampled or calculated in synchronism with generation of the TDC signal. These also apply to the following discrete data. It should be noted that in the following description, the symbol k and the like provided for the discrete data are omitted as deemed appropriate.

According to the above-described spectral factorization method, since the estimated value Pmi_act•i is calculated using the values PF•i and VF•i obtained by performing the predetermined low-pass filtering process on the in-cylinder pressure Pcyl•i and the displacement data V•i of each cylinder, it is possible to avoid relative phase deviation from being caused between the in-cylinder pressure Pcyl•i and the displacement data V•i, thereby making it possible to enhance accuracy of calculation of the estimated value Pmi_act•i. It should be noted that in the present embodiment, the estimated value-calculating section 30 corresponds to the work-done-amount parameter-calculating means and the second control value-calculating means, and the estimated value Pmi_act•i to an unprocessed value.

Next, the statistically processed value-calculating section 31 calculates a statistically processed value Pmi_ls•i of the indicated mean effective pressure by performing a statistical process, referred to hereinafter, on the estimated value Pmi_act•i. More specifically, the statistically processed value Pmi_ls•i is calculated with a fixed-gain sequential least-squares method algorithm expressed by the following equations (2) and (3):

$$\text{Pmi\_ls}\#i(k) = \text{Pmi\_ls}\#i(k-1) + \frac{Pav}{1+Pav}\text{E\_id}\#i(k) \quad (2)$$

$$\text{E\_id}\#i(k) = \text{Pmi\_act}\#i(k) - \text{Pmi\_ls}\#i(k-1) \quad (3)$$

In the above equation (2), Pav represents a predetermined filtering gain, and E_id•i a difference calculated by the equation (3).

Figure 4:
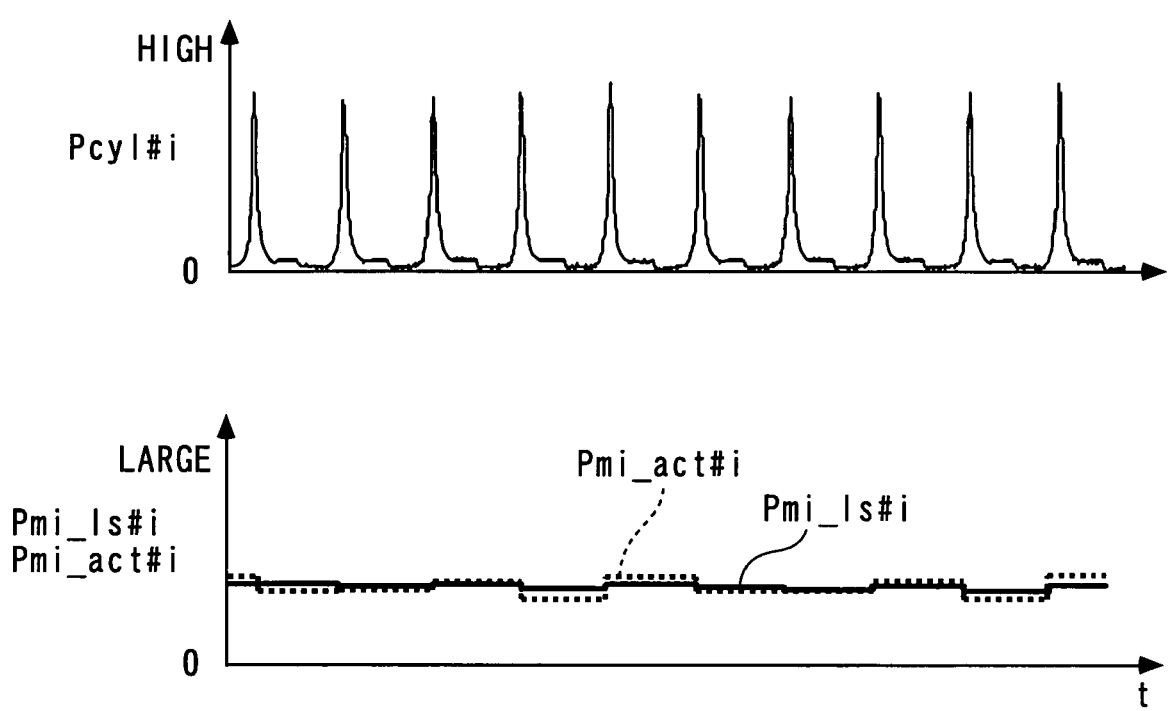
FIG. 4 is a timing diagram showing changes in estimated value Pmi_act#i and statistically processed value Pmi_ls#i caused by variations in in-cylinder pressure occurring from one combustion cycle to another.

As is clear from comparison between the statistically processed value Pmi_ls•i calculated as above and the estimated value Pmi_act•i, as shown in FIG. 4, the range of change of the statistically processed value Pmi_ls•i is considerably smaller than that of the estimated value Pmi_act•i, whereby even when the in-cylinder pressure Pcyl•i varies between the combustion cycles of the engine, the statistical process can suppress the adverse influence of the variation.

It should be noted that in the present embodiment, the statistically processed value-calculating section 31 corresponds to the work-done-amount parameter-calculating means and the second control value-calculating means, and the statistically processed value Pmi_ls•i to a work-done-amount parameter.

Further, the smoothing target value-calculating section 32 calculates a smoothing target value Piav_cmd by weighted averaging expressed by the following equation (4). The smoothing target value Piav_cmd is for smoothing the indicated mean effective pressures, that is, the work-done-amounts of the four cylinders •1 to •4.

$$\text{Piav\_cmd}(k) = w1 \cdot \text{Pmi\_ls\_min1}(k) + w2 \cdot \text{Pmi\_ls\_min2}(k) \quad (4)$$

wherein w1 and w2 represent weighting coefficients, and are set to predetermined values which satisfy the relationship of w1+w2=1, 0≦w1, and 0≦w2. Pmi_ls_min1 and Pmi_ls_min2 represent first and second reference values. More specifically, when the largest value of the four statistically processed values Pmi_ls•i is set to a maximum value Pmi_ls_max, and Eps_Pmi is set to a predetermined positive value, the first reference value Pmi_ls_min1 is set to a minimum value of statistically processed values which satisfy the relationship of (Pmi_ls_max−Eps_Pmi)≦Pmi_ls•i. Further, the second reference value Pmi_ls_min2 is set to a second minimum value of the statistically processed values which satisfy the relationship of (Pmi_ls_max−Eps_Pmi) ≦Pmi_ls•i.

It should be noted that in the present embodiment, the smoothing target value-calculating section 32 corresponds to the target value-calculating means, and the smoothing target value Piav_cmd to one target value.

Furthermore, the smoothing controller 33 calculates a smoothing correction value DIGPIAV•i, as described hereafter. First, when Lim_piav (Usl_piav•i(k−1)=Usl_piav•i(k−1)) holds in a limit value Lim_piav (Usl_piav•i), a smoothing control input value Usl_piav•i is calculated with a two-degree-of-freedom control algorithm expressed by the following equations (5) to (9). The two-degree-of-freedom control algorithm is a combination of a target value filter algorithm expressed by the equation (9), and a sliding mode control algorithm expressed by the equations (5) to (8).

$$\text{Usl\_piav}\#i(k) = \quad (5)$$
$$\text{Krch\_piav} \cdot \sigma\_\text{piav}\#i(k) + \text{Kadp\_piav}\#i(k) \cdot \text{sum\_}\sigma\_\text{piav}\#i(k)$$

$$\text{sum\_}\sigma\_\text{piav}\#i(k) = \sum_{j=0}^{k} \sigma\_\text{piav}\#i(j) \quad (6)$$

$$\sigma\_\text{piav}\#i(k) = EPIAV\#i(k) + S\_\text{piav} \cdot EPIAV\#i(k-1) \quad (7)$$

$$EPIAV\#i(k) = \text{Pmi\_ls}\#i(k) - \text{Piav\_cmd\_f}(k) \quad (8)$$

$$\text{Piav\_cmd\_f}(k) = \quad (9)$$
$$-R\_\text{piav} \cdot \text{Piav\_cmd\_f}(k-1) + (1 + R\_\text{piav})\text{Piav\_cmd}(k)$$

In the above-described equation (5), Krch_piav•i and Kadp_piav•i represent a predetermined reaching law gain, and a predetermined adaptive law gain, respectively. Further, σ_piav•i represents a switching function calculated by the equation (7), and sum_σ_piav•i an integral value of a switching function calculated by the equation (6). In the equation (7), S_piav represents a switching function-setting parameter set such that −1<S_piav<0 holds, and EPIAV•i a difference defined by the equation (8). In the equation (8), Piav_cmd_f represents a filtered value of the smoothing target value Piav_cmd, and is calculated with a first-order lag filter algorithm expressed by the equation (9). In the equation (9), R_piav represents a target value response-specifying parameter set such that −1<R_piav<0 holds.

Then, the smoothing correction value DIGPIAV•i is calculated by the following equation (10) based on the smoothing control input value Usl_piav•i calculated as above.

$$DIGPIAV•i(k) = Lim\_piav(Usl\_piav•i(k)) \qquad (10)$$

wherein Lim_piav (Usl_piav•i(k)) represents a limited value obtained by performing a limiting process on a smoothing control input value Usl_piav•i(k), and is calculated specifically as a value obtained by limiting Usl_piav•i(k) within a predetermined range defined by a predetermined lower limit value DIGPIAV_L and a predetermined upper limit value DIGPIAV_H. More specifically, when Usl_piav•i(k)<DIGPIAV_L holds, Lim_piav (Usl_piav•i(k))=DIGPIAV_L is set; when DIGPIAV_L≦Usl_piav•i(k)<DIGPIAV_H holds, Lim_piav (Usl_piav•i(k))=Usl_piav•i(k) is set; and when Usl_piav•i(k)>DIGPIAV_H holds, Lim_piav (Usl_piav•i(k))=DIGPIAV_H is set.

As described above, Lim_piav (Usl_piav•i(k−1) =Usl_piav•i(k−1) holds when DIGPIAV_L≦Usl_piav•i(k−1)=DIGPIAV_H holds, and in this case, the smoothing correction value DIGPIAV•i is calculated by the aforementioned equations (5) to (10).

On the other hand, when Lim_piav (Usl_piav•i(k−1) ≠Usl_piav•i(k−1) holds, i.e. when Lim_piav (Usl_piav•i(k−1)=DIGPIAV_L or Lim_piav (Usl_piav•i(k−1)=DIGPIAV_H held when the process for calculating the smoothing correction value DIGPIAV•i was executed last time, the following equation (11) is used in place of the above-mentioned equation (6) in executing the process for calculating the smoothing control input value Usl_piav•i this time. More specifically, the smoothing control input value Usl_piav•i is calculated by the equations (5) and (7) to (11), and update of the integral value sum_U_piav•i of the switching function is stopped.

$$sum\_\sigma\_piav•i(k) = sum\_\sigma\_piav•i(k−1) \qquad (11)$$

The update of the integral value sum_σ_piav•i of the switching function is thus stopped when Lim_piav (Usl_piav•i)≠Usl_piav•i holds, for the following reason: Assuming that the update of the integral value sum_σ_piav•i of the switching function is continued in a state where Usl_piav•i is limited to the value DIGPIAV_L or DIGPIAV_H since Usl_piav•i assumes a value outside the predetermined range, the integral value sum_σ_piav•i of the switching function increases. As a result, when the smoothing control input value Usl_piav•i has returned to the predetermined range, it takes time before the increased integral value sum_σ_piav•i of the switching function returns to a proper value, during which the accuracy of control is degraded. Therefore, the update of the integral value sum_σ_piav•i of the switching function is stopped to avoid the inconvenience.

It should be noted that in the present embodiment, the smoothing controller 33 corresponds to the ignition timing-determining means and the second control value-calculating means, and the smoothing correction value DIGPIAV•i to the second control value.

The identification signal value-calculating section 34 (first control value-calculating means) calculates an identification signal value DIGID by a method which has already been proposed by the present assignee in Japanese Patent Application No. 2003-385741, as described hereafter. More specifically, as described hereinafter, the identification signal value DIGID is calculated by searching a table shown in FIG. 5 according to a counter value Cdigid. The identification signal value DIGID is set to a value which can satisfy self-exciting conditions for properly identifying an MBT difference EIGOP, through identifying calculation by the MBT-estimating section 35, referred to hereinafter. More specifically, the identification signal value DIGID is set to a value of a varying signal value or a random signal value including three or more sine waves.

Further, as described hereinafter, the MBT-estimating section 35 (first control value-calculating means) calculates an MBT difference EIGOP•i by the method which has already been proposed by the present assignee in Japanese Patent Application No. 2003-385741. The MBT difference EIGOP•i represents the difference between an estimated MBT which is an estimated value of MBT (Minimum advance for Best Torque) in each cylinder, and the currently set ignition timing IGLOG, that is, the amount of advance from the currently set ignition timing IGLOG to the estimated MBT. More specifically, the MBT difference EIGOP•i is calculated by the following equation (12):

$$EIGOP\#i(k) = \frac{-Bigop\#i(k)}{2 \cdot Aigop\#i(k)} \qquad (12)$$

In the above equation (12), Aigop•i and Bigop•i represent coefficients of a characteristic curve (quadratic curve), referred to hereinafter, of the estimated MBT. A coefficient vector θ•i including Aigop•i and Bigop•i as elements thereof is calculated as described hereafter.

First, the coefficient vector θ•i is defined by the following equation (13):

$$\theta•i^T(k) = [Aigop•i(k), Bigop•i(k), Cigop•i(k)] \qquad (13)$$

The coefficient vector θ•i is calculated by sequentially identifying an unprocessed coefficient vector θ•i' with a fixed-gain algorithm to which is applied a δ correcting method expressed by the following equations (14) and (23), and performing a limiting process expressed by the following equations (24) and (25) on the identified unprocessed coefficient vector θ•i'.

$$\theta\#i'(k) = \theta\_base + d\theta\#i(k) \qquad (14)$$

$$d\theta\#i(k) = \delta \cdot d\theta\#i(k-1) + KP\#i(k) \cdot Eigop\#i(k) \qquad (15)$$

$$KP\#i(k) = \frac{P \cdot \zeta\#i(k)}{1 + \zeta\#i^T(k) \cdot P \cdot \zeta\#i(k)} \qquad (16)$$

$$Eigop\#i(k) = Pmi\_act\#i(k) - Pmi\_hat\#i(k) \qquad (17)$$

$$\begin{aligned}Pmi\_hat\#i(k) &= \theta\# i'^T(k-1) \cdot \zeta\#i(k) \\ &= Aigop\#i'(k-1) \cdot DIGID(k)^2 + \\ &\quad Bigop\#i(k-1) \cdot DIGID(k) + Cigop\#i(k-1)\end{aligned} \qquad (18)$$

$$\theta\# i'^T(k) = [Aigop\#i'(k), Bigop\#i(k), Cigop\#i(k)] \qquad (19)$$

$$d\theta\# i^T(k) = [Aigop\#i'(k) - Aigop\_base, \qquad (20)$$
$$\qquad\qquad dBigop\#i'(k), dCigop\#i'(k)]$$

$$\theta\_base^T(k) = [Aigop\_base, 0, Cigop\_base] \qquad (21)$$

-continued $$\zeta^T(k) = [DIGID(k)^2, DIGID(k), 1] \quad (22)$$

$$\delta = \begin{bmatrix} 1 & 0 & 0 \\ 0 & \delta' & 0 \\ 0 & 0 & \delta' \end{bmatrix} \quad (23)$$

$$\theta\#i(k) = \mathrm{Lim\_a}(\theta\#i'(k)) \quad (24)$$

$$\mathrm{Lim\_a}(\theta\#i'(k))^T = \quad (25)$$
$$[\mathrm{Lim\_a}(Aigop\#i'(k)), Bigop\#i(k), Cigop\#i(k)]$$

In the above equation (14), the transposed matrix of the unprocessed coefficient vector θ•i' is expressed by the equation (19). In the equation (19), Aigop•i' represents an identified value of a coefficient Aigop•i before being subjected to a limiting process described hereinafter. Further, in the equation (14), θ_base represents a reference value vector the transposed matrix of which is defined by the equation (21), and dθ•i a correction term vector the transposed matrix of which is defined by the equation (20). The correction term vector dθ•i is calculated by the equation (15) in which δ represents a forgetting vector defined by the equation (23). In the equation (23), δ' represents a forgetting coefficient which is set such that 0<δ'<1 holds.

Further, in the equation (15), KP•i represents a vector of a gain coefficient calculated by the equation (16). In the equation (16), P represents a predetermined fixed gain (fixed value), and ζ a vector of an identification signal value the transposed matrix of which is defined by the equation (22). Further, in the equation (15), Eigop represents a difference calculated by the equation (17). In the equation (17), Pmi-_hat represents an identified value of the indicated mean effective pressure, and calculated by the equation (18). The equation (18) expresses an estimated MBT curve (quadratic curve).

Furthermore, the coefficient vector θ•i is calculated by the aforementioned equation (24) using the unprocessed coefficient vector θ•i' calculated as above. In the equation (24), Lim_a (θ•i') represents a limited value obtained by performing the limiting process on the unprocessed coefficient vector θ•i', and the transposed matrix thereof is defined by the equation (25). In the equation (25), Lim_a (Aigop•i') represents a limited value obtained by performing the limiting process on Aigop•i' such that Lim_a (Aigop•i')<0 necessarily holds, and assumes a value which satisfies the relationship of Lim_a (Aigop•i')=Aigop•i, as is clear from comparison between the equations (24) and (25), and the equation (19). That is, the coefficient Aigop•i is necessarily identified such that it is a negative value. This is because when the MBT difference EIGOP•i is close to a value of 0, the coefficient Aigop•i can be erroneously identified as a positive value which causes a characteristic curve of the estimated MBT expressed by the equation (18) to be convex downward, and hence is calculated as described above in order to avoid such an erroneous identification.

Further, as described hereinafter, the optimization controller 36 calculates an optimization correction value DIGOP•i using the MBT difference EIGOP•i determined by the MBT-estimating section 35. First, when Lim_igop (Usl_igop•i(k−1)=Usl_igop•i(k−1) holds in a limited value Lim_igop (Usl_igop•i), referred to hereinafter, an optimization control input value Usl_igop•i is calculated with a sliding mode control algorithm expressed by the following equations (26) to (28).

$$\mathrm{Usl\_igop}(k) = \mathrm{Krch\_igop} \cdot \sigma\_\mathrm{igop}\#i(k) + \mathrm{Kadp\_igop} \cdot \mathrm{sum}\_\sigma\_\mathrm{igop}\#i(k) \quad (26)$$

$$\mathrm{sum}\_\sigma\_\mathrm{igop}\#i(k) = \sum_{j=0}^{k} \sigma\_\mathrm{igop}\#i(j) \quad (27)$$

$$\sigma\_\mathrm{igop}\#i(k) = EIGOP\#i(k) + \mathrm{S\_igop} \cdot EIGOP\#i(k-1) \quad (28)$$

In the above equation (26), Krch_igop•i and Kadp_igop•i represent a predetermined reaching law gain, and a predetermined adaptive law gain, respectively. Further, σ_igop•i represents a switching function calculated by the equation (28), and sum_σ_igop•i an integral value of a switching function calculated by the equation (27). In the equation (28), S_igop represents a switching function-setting parameter set such that −1<S_igop<0 holds.

Then, the optimization correction value DIGOP•i is calculated by the following equation (29) based on the optimization control input value Usl_igop•i calculated as above. It should be noted that the optimization correction value DIGOP•i is calculated as a value for correcting a basic ignition timing IGBASE, referred to hereinafter, such that the basic ignition timing IGBASE is advanced. This is because generally, the basic ignition timing IGBASE is set to a more retarded value than the MBT.

$$DIGOP\bullet i(k) = \mathrm{Lim\_igop}(Usl\_igop(k)) \quad (29)$$

wherein Lim_igop (Usl_igop•i(k)) represents a limited value obtained by performing the limiting process on the optimization control input value Usl_igop•i(k), and is calculated specifically as a value obtained by limiting the optimization control input value Usl_igop•i(k) within a predetermined range defined by a predetermined lower limit value DIGOP_L and a predetermined upper limit value DIGOP_H.

More specifically, when Usl_igop•i(k)<DIGOP_L holds, Lim_igop (Usl_igop•i(k))=DIGOP_L is set; when DIGOP_L≦Usl_igop•i(k)=DIGOP_H holds, Lim_igop (Usl_igop•i(k))=Usl_igop•i(k) is set; and when Usl_igop•i(k)>DIGOP_H holds, Lim_igop (Usl_igop•i(k))=DIGOP_H is set. It should be noted that the lower limit value DIGOP_L is set to a value larger than the aforementioned lower limit value DIGPIAV_L, and the upper limit value DIGOP_H is set to a value smaller than the aforementioned upper limit value DIGPIAV_H.

As described above, Lim_igop (Usl_igop•i(k−1)) =Usl_igop•i(k−1) holds when DIGOP_L≦Usl_igop•i(k−1) ≦DIGOP_H holds, and in this case, the optimization correction value DIGOP•i is calculated by the above-described equations (26) to (29).

On the other hand, when Lim_igop (Usl_igop•i(k−1) ≠Usl_igop•i(k−1) holds, or when DIGOP•i(k−1) ≧DIGPIAV•i(k−1) holds, the following equation (30) is used in place of the aforementioned equation (27) in a process for calculating the current optimization control input value Usl_igop•i(k). More specifically, the optimization correction value DIGOP•i is calculated by the equations (26) and (28) to (30), and update of the integral value sum_σ_igop•i of the switching function is stopped.

$$\mathrm{sum}\_\sigma\_\mathrm{igop}\bullet i(k) = \mathrm{sum}\_\sigma\_\mathrm{igop}\bullet i(k-1) \quad (30)$$

As described hereinabove, when Lim_igop (Usl_igop•i (k))≠Usl_igop•i(k) holds, or when DIGOP•i≧DIGPIAV•i holds, the update of the integral value sum_σ_igop•i of the switching function is stopped, for the following reason:

When the update of the integral value sum_σ_igop•i of the switching function is continued in a state where the current optimization control input value Usl_igop•i(k) assumes a value outside the above-mentioned predetermined range and hence is limited to the value DIGOP_L or DIGOP_H, or in a state where a correction value DIGCMP•i, referred to hereinafter, is not set to optimization correction value DIGOP•i since DIGOP•i≧DIGPIAV•i holds, the integral value sum_σ_igop•i of the switching function increases. As a result, when the current optimization control input value Usl_igop•i(k) has returned to the predetermined range, or when the correction value DIGCMP•i is set to the optimization correction value DIGOP•i since DIGOP•i<DIGPIAV•i holds, it takes time before the increased integral value sum_σ_igop•i of the switching function reaches a proper value, during which the accuracy of control is degraded. Therefore, the update of the integral value sum_σ_igop•i of the switching function is stopped to avoid this inconvenience.

It should be noted that in the present embodiment, the optimization controller 36 corresponds to the first control value-calculating means, and the optimization correction value DIGOP•i to the first control value.

Further, the correction value-calculating section 37 calculates the correction value DIGCMP•i by the following equation (31) or (32) based on the result of comparison between the smoothing correction value DIGPIAV•i and the optimization correction value DIGOP•i, calculated as above.

When $DIGOP•i(k) \geq DIGPIAV•i(k)$ holds, $DIGCMP•i(k) = DIGPIAV•i(k)$           (31)

When $DIGOP•i(k) < DIGPIAV•i(k)$ holds, $DIGCMP•i(k) = DIGOP•i(k)$           (32)

As is clear from the equations (31) and (32), the correction value DIGCMP•i is calculated as a value obtained by performing the limiting process on the smoothing correction value DIGPIAV•i using the optimization correction value DIGOP•i as an upper limit value. The reason for this will be described hereinafter. It should be noted that in the present embodiment, the correction value-calculating section 37 corresponds to the ignition timing-determining means and the final control value-calculating means, and the correction value DIGCMP•i to a final control value.

Figure 6:
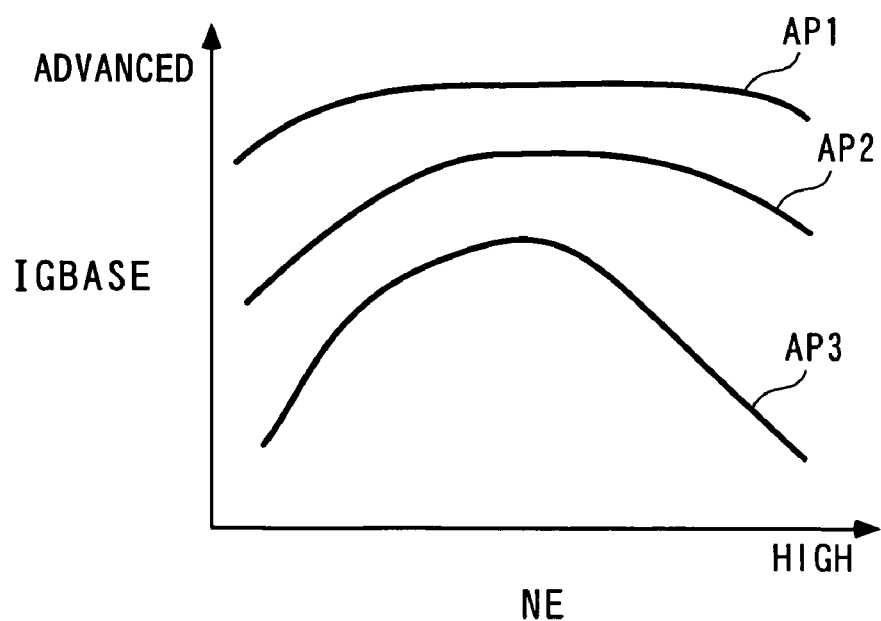
FIG. 6 is a diagram showing a map for use in calculation of basic ignition timing IGBA, by way of example.

On the other hand, the basic ignition timing-calculating section 38 calculates the basic ignition timing IGBASE by searching a map shown in FIG. 6 according to the engine speed NE and the accelerator pedal opening AP. In this map, the basic ignition timing IGBASE is set to a less advanced value, as the accelerator pedal opening AP is larger. This is to avoid knocking which is liable to occur when the engine 3 is in a high-load region.

Moreover, the basic ignition timing IGBASE is set to a more advanced value, as the engine speed NE is higher, in a low engine speed region, whereas in a high engine speed region, it is set to a less advanced value, as the engine speed NE is higher. This is to raise the temperature of combustion gases to thereby enhance combustion efficiency by setting ignition timing to a more advanced value, as the engine speed NE is higher, since knocking is not liable to occur in the low engine speed region. On the other hand, in the high engine speed region where knocking is liable to occur, the basic ignition timing IGBASE is set as described above so as to avoid occurrence of knocking by setting the ignition timing to a less advanced value, as the engine speed NE is higher. It should be noted that in the above map, the basic ignition timing IGBASE is set to a more retarded value than that of the MBT.

Further, the adder 39 calculates the ignition timing IGLOG•i by the following equation (33) based on the basic ignition timing IGBASE, the identification signal value DIGID, and the correction value DIGCMP•i, calculated as above.

$IGLOG•i(k) = IGBASE(k) + DIGID(k) + DIGCMP•i(k)$       (33)

It should be noted that in the present embodiment, the basic ignition timing-calculating section 38 and the adder 39 correspond to the ignition timing-determining means and the ignition timing-calculating means.

Figure 7:
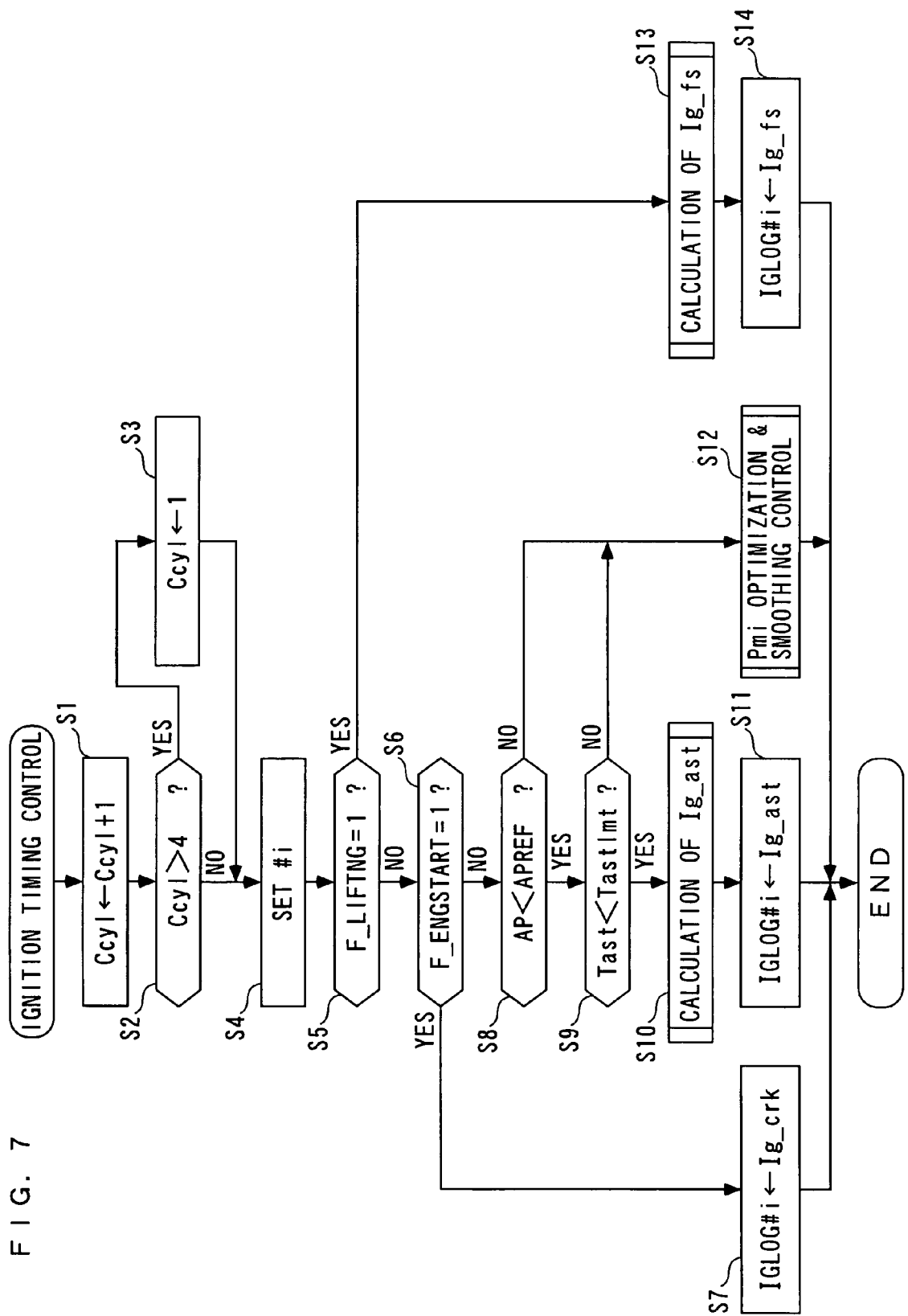
FIG. 7 is a flowchart showing an ignition timing control process.

Next, the ignition timing control process carried out by the ECU 2 will be described with reference to FIG. 7. This process is for calculating the ignition timing IGLOG, and is carried out in synchronism with generation of the TDC signal.

In this process, first, in a step 1 (shown as S1 in abbreviated form in FIG. 7; the following steps are also shown in abbreviated form), the counter value Ccyl is incremented by a value of 1. Then, the process proceeds to a step 2, wherein it is determined whether or not the counter value Ccyl is larger than a value of 4.

If the answer to this question is negative (NO), the process proceeds to a step 4, referred to hereinafter. On the other hand, if the answer to the question of the step 2 is affirmative (YES), i.e. if Ccyl>4 holds, the process proceeds to a step 3, wherein the counter value Ccyl is set to a value of 1, and then the process proceeds to the step 4. That is, the counter value Ccyl is incremented from a value of 1 to a value of 4, whereafter it is incremented again from a value of 1.

In the step 4, the cylinder number value •i is set by searching a table shown in FIG. 8 according to the counter value Ccyl. As is clear from the FIG. 8, the cylinder number value •i is set in the order of •1→•3→•4→•2→•1 . . . when the counter value Ccyl is set in the order of 1→2→3→4→1, as described above.

Then, in a step 5, it is determined whether or not a lift failure flag F_LIFTNG is equal to 1. In a determination process, not shown, the lift failure flag F_LIFTNG is set to 1 when the variable valve lift mechanism 10 is faulty, and set to 0 when the variable valve lift mechanism 10 is normal.

If the answer to this question is negative (NO), i.e. if the variable valve lift mechanism 10 is normal, the process proceeds to a step 6, wherein it is determined whether or not an engine start flag F_ENGSTART is equal to 1. The engine start flag F_ENGSTART is set by determining in a determination process, not shown, whether or not engine starting control, i.e. cranking is being executed, based on the engine speed NE and an ON/OFF signal output from the IG•SW 25. More specifically, when the engine starting control is being executed, the engine start flag F_ENGSTART is set to 1, and otherwise set to 0.

If the answer to the question is affirmative (YES), i.e. if the engine starting control is being executed, the process proceeds to a step 7, wherein the ignition timing IGLOG•i is set to a predetermined start-time value Ig_crk (e.g. BTDC 10°) for starting of the engine 3, followed by terminating the present process.

On the other hand, if the answer to the question of the step 6 is negative (NO), i.e. if the engine starting control is not being executed, the process proceeds to a step 8, wherein it is determined whether or not the accelerator pedal opening AP is smaller than a predetermined value APREF. If the answer to this question is affirmative (YES), i.e. if the accelerator pedal is not stepped on, the process proceeds to a step 9, wherein it is determined whether or not the timer count value Tast of a post-start timer is smaller than a predetermined value Tastlmt. The post-start timer counts a time period elapsed after the start of the engine 3, and is formed by an upcount timer.

If the answer to this question is affirmative (YES), i.e. if Tast<Tastlmt holds, it is judged that catalyst warmup control should be executed, so that the process proceeds to a step 10, wherein a catalyst warmup value Ig_ast is calculated. More specifically, the catalyst warmup value Ig_ast is calculated with a sliding mode control algorithm expressed by the following equations (34) to (36).

$$Ig\_ast(k) = Ig\_ast\_base - Krch\_ast \cdot \sigma\_ast(k) - Kadp\_ast \cdot \sum_{i=0}^{k} \sigma\_ast(i) \quad (34)$$

$$\sigma\_ast(k) = Enast(k) + pole\_ast \cdot Enast(k-1) \quad (35)$$

$$Enast(k) = NE(k) - NE\_ast \quad (36)$$

In the equation (34), Ig_ast_base represents a predetermined catalyst warmup reference ignition timing (e.g. BTDC 5°), and Krch_ast and Kadp_ast represent predetermined feedback gains. Further, $\sigma$_ast represents a switching function defined by the equation (35). In the equation (35), pole_ast represents a switching function-setting parameter set to a value which satisfies the relationship of $-1<$pole_ast$<0$, and Enast represents a follow-up error calculated by the equation (36). In the equation (36), NE_ast represents a predetermined catalyst warmup target engine speed (e.g. 1800 rpm). With the above-described control algorithm, the catalyst warmup value Ig_ast is calculated as a value for causing the engine speed NE to converge to the catalyst warmup target engine speed NE_ast.

Then, the process proceeds to a step 11, wherein the ignition timing IGLOG•i is set to the catalyst warmup value Ig_ast, followed by terminating the present process.

On the other hand, if the answer to the question of the step 8 or the step 9 is negative (NO), i.e. if the accelerator pedal is stepped on, or if Tast$\geq$Tastlmt holds, the process proceeds to a step 12, wherein a Pmi optimization and smoothing control process is carried out.

Figure 9:
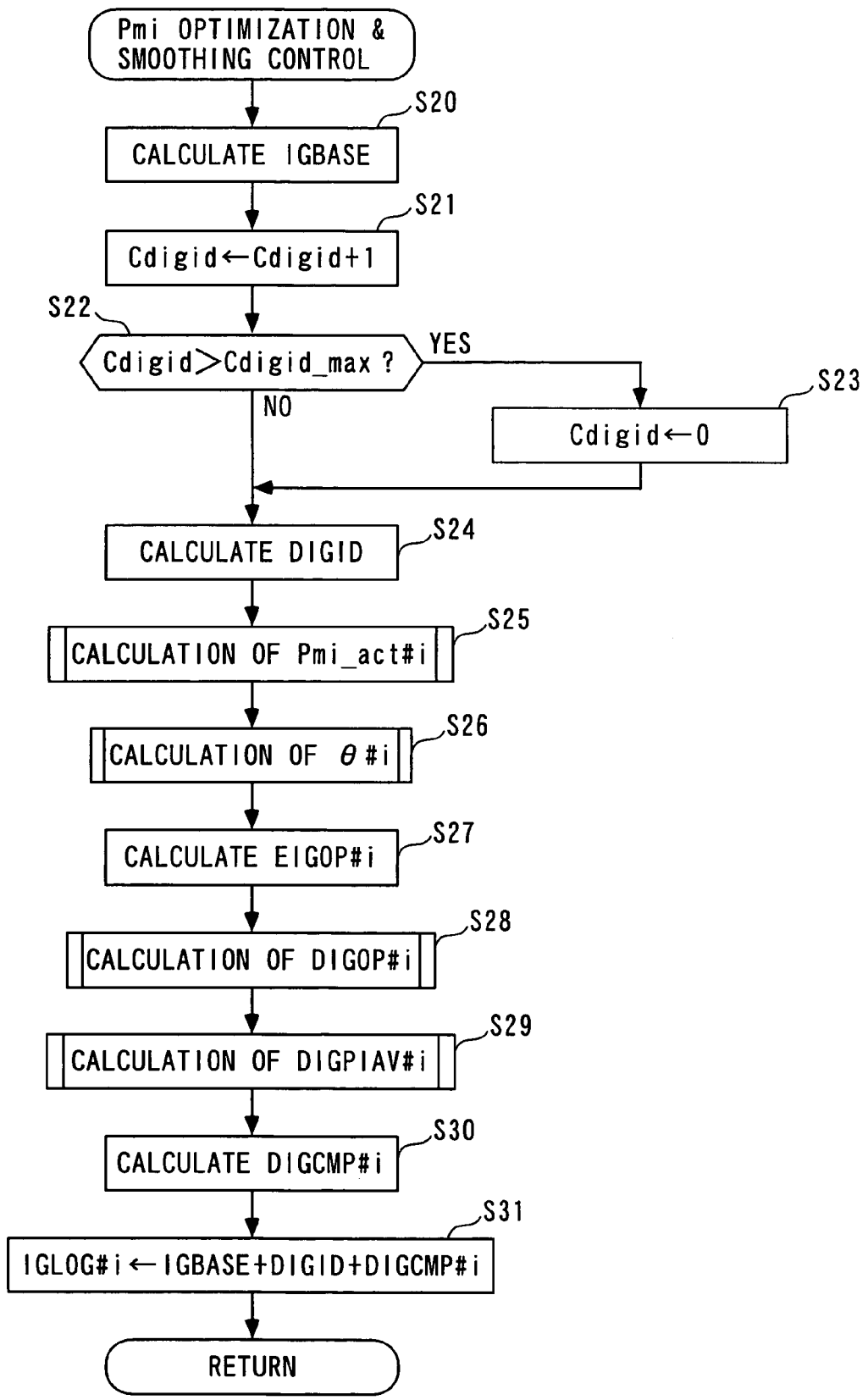
FIG. 9 is a flowchart showing a Pmi optimizing & averaging control process.

The Pmi optimization and smoothing control process is carried out specifically as shown in FIG. 9. First, in a step 20, the basic ignition timing IGBASE is calculated. More specifically, as described hereinbefore, the basic ignition timing IGBASE is calculated by searching the map shown in FIG. 6 according to the engine speed NE and the accelerator pedal opening AP.

Then, the process proceeds to a step 21, wherein a counter value Cdigid is incremented by a value of 1. Then, in a step 22, it is determined whether or not the counter value Cdigid is larger than a predetermined upper limit value Cdigid_max. If the answer to this question is negative (NO), the process proceeds to a step 24, referred to hereinafter.

On the other hand, if the answer to the question of the step 22 is affirmative (YES), i.e. if Cdigid>Cdigid_max holds, the process proceeds to a step 23, wherein the counter value Cdigid is set to a value of 0, and then the process proceeds to the step 24. That is, the counter value Cdigid is incremented from a value of 0 to a value of Cdigid_max, whereafter it is reset to a value of 0, and incremented again.

Figure 5:
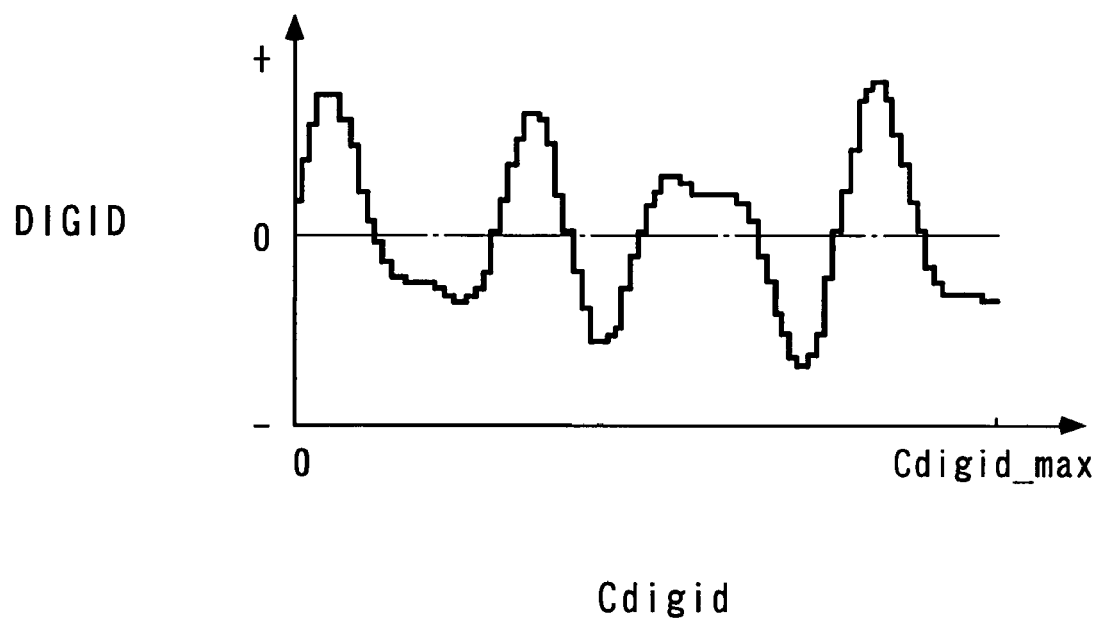
FIG. 5 is a diagram showing a table for use in calculation of an identification signal value DIGID, by way of example.

In the step 24, as described hereinabove, the identification signal value DIGID is calculated by searching the table shown in FIG. 5 according to the counter value Cdigid.

Then, the process proceeds to a step 25, wherein the estimated value Pmi_act•i of the indicated mean effective pressure is calculated by the aforementioned equation (1). After that, in a step 26, the coefficient vector θ•i is calculated by the aforementioned equations (14) to (25).

Next, in a step 27, the MBT difference EIGOP•i is calculated by the aforementioned equation (12), and thereafter in a step 28, the optimization correction value DIGOP•i is calculated by the aforementioned equations (26) to (29), or the aforementioned equations (26) and (28) to (30).

Subsequently, in a step 29, the smoothing correction value DIGPIAV•i is calculated by the aforementioned equations (5) to (10), or the aforementioned equations (5) and (7) to (11). Then, in a step 30, the correction value DIGCMP•i is calculated by the aforementioned equation (31) or (32).

Next, in a step 31, the sum of the basic ignition timing IGBASE, the identification signal value DIGID, and the correction value DIGCMP•i, calculated as above, is set to the ignition timing IGLOG•i, followed by terminating the present process.

Referring again to FIG. 7, after carrying out the Pmi optimization and smoothing control process as described above, in the step 12, the present process is terminated.

On the other hand, if the answer to the question of the step 5 is affirmative (YES), i.e. if the variable valve lift mechanism 10 is faulty, the process proceeds to a step 13, wherein a failure-time value Ig_fs is calculated. More specifically, the failure-time value Ig_fs is calculated with a sliding mode control algorithm expressed by the following equations (37) to (39).

$$Ig\_fs(k) = \quad (37)$$
$$Ig\_fs\_base - Krch\_fs \cdot \sigma\_fs(k) - Kadp\_fs \cdot \sum_{i=0}^{k} \sigma\_fs(i)$$

$$\sigma\_fs(k) = Enfs(k) + pole\_fs \cdot Enfs(k-1) \quad (38)$$

$$Enfs(k) = NE(k) - NE\_fs \quad (39)$$

In the above equation (37), Ig_fs_base represents a predetermined reference ignition timing (e.g. TDC±0°) for a failure time, and Krch_fs and Kadp_fs represent predetermined feedback gains. Further, $\sigma$_fs represents a switching function defined by the equation (38). In the equation (38), pole_fs represents a switching function-setting parameter set to a value which satisfies the relationship of $-1<$pole_fs$<0$, and Enfs represents a follow-up error calculated by the equation (39). In the equation (39), NE_fs represents a predetermined failure-time target engine speed (e.g. 2000 rpm). With the above control algorithm, the failure-time value Ig_fs is calculated as a value for causing the engine speed NE to converge to the failure-time target engine speed NE_fs.

Then, the process proceeds to a step 14, wherein the ignition timing IGLOG•i is set to the failure-time value Ig_fs, followed by terminating the present process.

Figure 10:
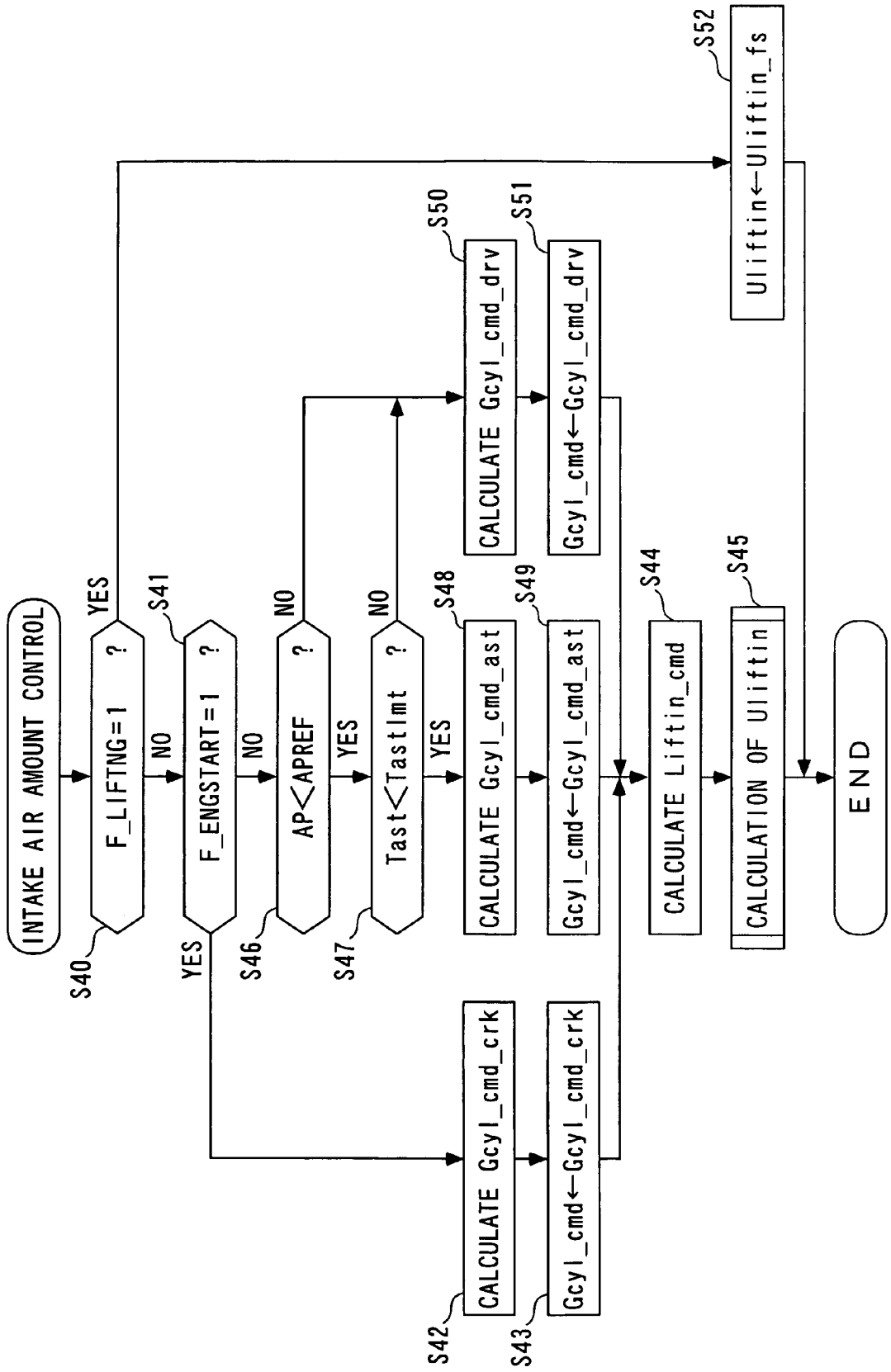
FIG. 10 is a flowchart showing an intake air amount control process.

Hereinafter, an intake air amount control process carried out by the ECU 2 will be described with reference to FIG. 10. The present process calculates the lift control input Uliftin for controlling the intake air amount via the variable valve lift mechanism 10, and is executed at a predetermined control period ΔT (e.g. 10 msec).

In this process, first, it is determined in a step 40 whether or not the aforementioned lift failure flag F_LIFTNG is equal to 1. If the answer to this question is negative (NO), i.e. if the variable valve lift mechanism 10 is normal, the process proceeds to a step 41, wherein it is determined whether or not the aforementioned engine start flag F_ENG-START is equal to 1.

Figure 11:
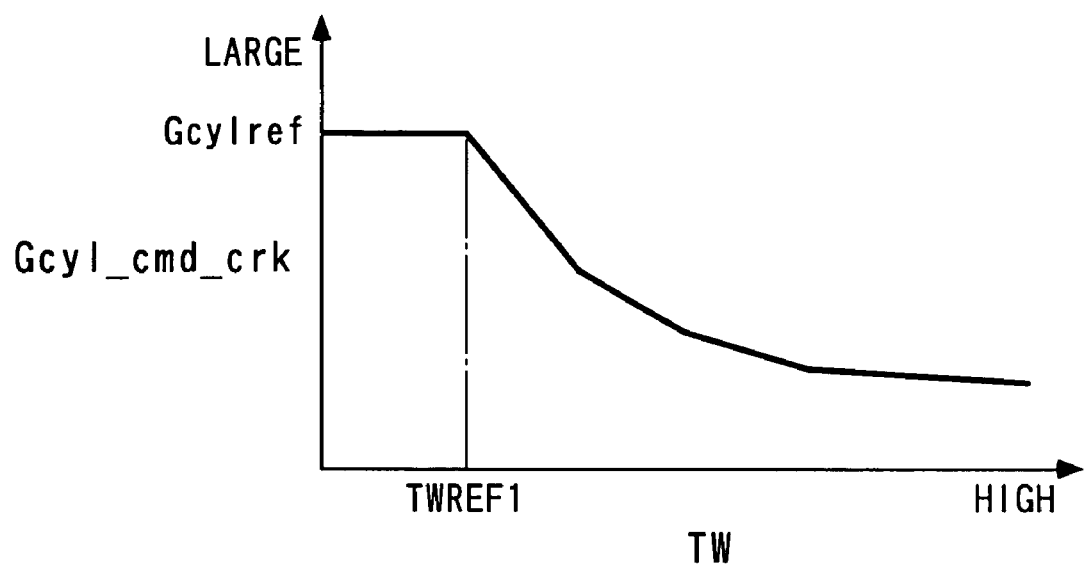
FIG. 11 is a diagram showing a table for use in calculation of a start-time value Gcyl_cmd_crk of a target intake air amount, by way of example.

If the answer to the above question is affirmative (YES), i.e. if the engine starting control is being executed, the process proceeds to a step 42, wherein a predetermined start-time value Gcyl_cmd_crk of a target intake air amount is calculated by searching a table shown in FIG. 11 according to the engine coolant temperature TW.

In this table, in a range where the engine coolant temperature TW is higher than a predetermined value TWREF1, the start-time value Gcyl_cmd_crk is set to a larger value as the engine coolant temperature TW is lower, and in a range where TW≦TWREF1 holds, the start-time value Gcyl_cmd_crk is set to a predetermined value Gcylref. This is to compensate for an increase in friction of the variable valve lift mechanism 10, which is caused when the engine coolant temperature TW is low.

Figure 12:
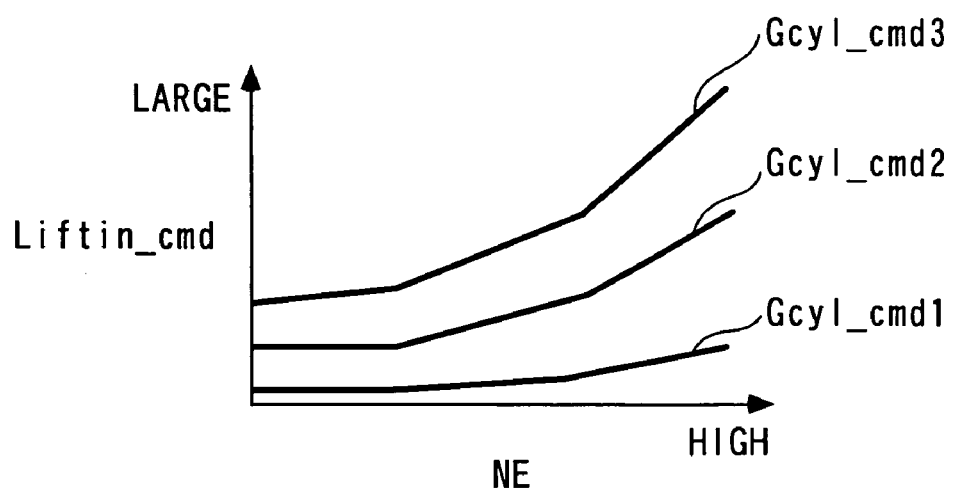
FIG. 12 is a diagram showing a map for use in calculating a target valve lift Liftin_cmd, by way of example.

Then, in a step 43, the target intake air amount Gcyl_cmd is set to the above-described start-time value Gcyl_cmd_crk. After that, the process proceeds to a step 44, wherein a target valve lift Liftin_cmd is determined by searching a map shown in FIG. 12 according to the target intake air amount Gcyl_cmd and the target engine speed NE_cmd. In FIG. 12, Gcyl_cmd1 to Gcyl_cmd3 represent predetermined values of the target intake air amount Gcyl_cmd, between which the relationship of Gcyl_cmd1<Gcyl_cmd2<Gcyl_cmd3 holds.

Referring to FIG. 12, in this map, as the target intake air amount Gcyl_cmd is larger, or as the engine speed NE is higher, the target valve lift Liftin_cmd is set to a larger value. This is because as the target intake air amount Gcyl_cmd is larger, or as the engine speed NE is higher, output power demanded of the engine 3 is larger, and hence a larger intake air amount Gcyl is demanded.

Subsequently, the process proceeds to a step 45, wherein the lift control input Uliftin is calculated. The lift control input Uliftin is calculated as a value for causing the valve lift Liftin to follow the target valve lift Liftin_cmd with a target value filter-type two-degree-of-freedom response-specifying control algorithm expressed by the following equations (40) to (43). It should be noted that in the following equations (40) to (43), discrete data with a symbol (m) indicates that it is data sampled or calculated in synchronism with the aforementioned control period ΔT.

$$Uliftin(m) = -\text{Krch\_lf} \cdot \sigma\_\text{lf}(m) - \text{Kadp\_lf} \cdot \sum_{i=0}^{m} \sigma\_\text{lf}(i) \quad (40)$$

$$\sigma\_\text{lf}(m) = E\_\text{lf}(m) + \text{pole\_lf} \cdot E\_\text{lf}(m-1) \quad (41)$$

$$E\_\text{lf}(m) = Liftin(m) - \text{Liftin\_cmd\_f}(m) \quad (42)$$

$$\text{Liftin\_cmd\_f}(m) = -\text{pole\_f\_lf} \cdot \text{Liftin\_cmd\_f}(m-1) + \\ (1 + \text{pole\_f\_lf})\text{Liftin\_cmd}(m) \quad (43)$$

In the above equation (40), Krch_if and Kadp_if represent a predetermined reaching law gain and a predetermined adaptive law gain, respectively. Further, σ_lf represents a switching function calculated by the equation (41). In the equation (41), E_if represents a difference calculated by the equation (42), and pole_if a switching function-setting parameter which is set to a value within a range of −1<pole_lf<0. Further, in the equation (42), Liftin_cmd_f represents a filtered value of the target valve lift, and is calculated with a target value filter algorithm (first-order lag filter algorithm) expressed by the equation (43). In the equation (43), pole_f_lf represents a target value response-specifying parameter, and is set to a value within a range of −1<pole_f_lf<0.

As described above, the lift control input Uliftin is calculated in the step 45, followed by terminating the present process.

On the other hand, if the answer to the question of the step 41 is negative (NO), i.e. if the engine starting control is not being executed, the process proceeds to a step 46, wherein it is determined whether or not the accelerator pedal opening AP is smaller than the predetermined value APREF. If the answer to this question is affirmative (YES), i.e. if the accelerator pedal is not stepped on, the process proceeds to a step 47, wherein it is determined whether or not the measured value Tast of the post-start timer is smaller than a predetermined value Tastlmt.

Figure 13:
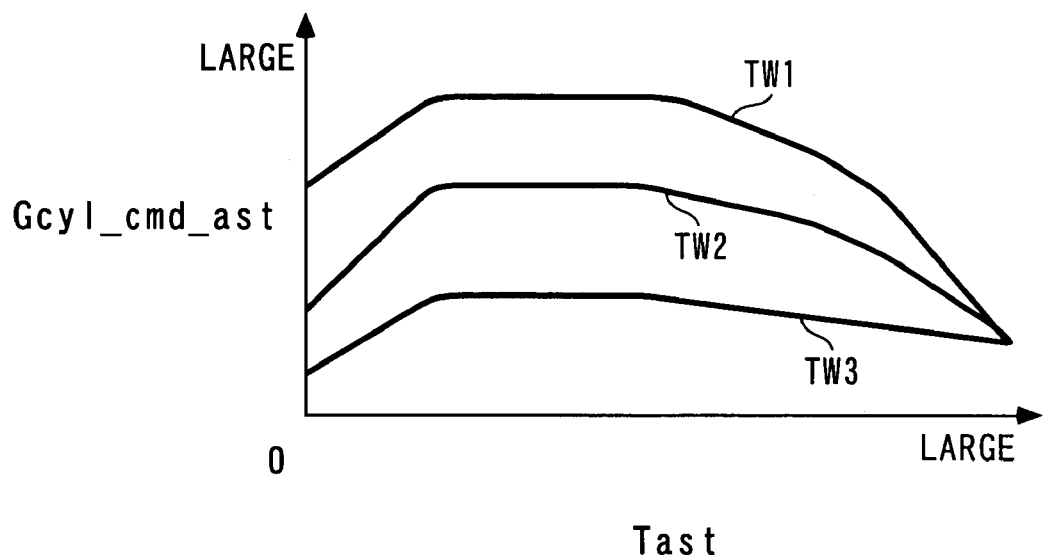
FIG. 13 is a diagram showing a map for use in calculating a catalyst warmup value Gcyl_cmd_ast of the target intake air amount during catalyst warmup control, by way of example.

If the answer to this question is affirmative (YES), i.e. if Tast<Tastlmt holds, it is judged that the catalyst warmup control should be executed, and the process proceeds to a step 48, wherein a catalyst warmup value Gcyl_cmd_ast of the target intake air amount is calculated by searching a map shown in FIG. 13 according to the measured value Tast of the post-start timer and the engine coolant temperature TW. In FIG. 13, TW1 to TW3 represent predetermined values of the engine coolant temperature TW, between which relationship of TW1<TW2<TW3 holds.

In this map, the catalyst warmup value Gcyl_cmd_ast is set to a larger value as the engine coolant temperature TW is lower. This is because as the engine coolant temperature TW is lower, it takes a longer time period to activate catalyst, and hence the volume of exhaust gasses is increased to shorten the time period required for activating the catalyst. Furthermore, in the above map, during a time period over which the measured value Tast of the post-start timer is small, the catalyst warmup value Gcyl_cmd_ast is set to a larger value as the measured value Tast is larger, whereas after the measured value Tast has become large to a certain extent, the catalyst warmup value Gcyl_cmd_ast is set to a smaller value as the measured value Tast is larger. This is because the warming up of the engine 3 proceeds along with the lapse of the execution time period of the catalyst warmup control, so that when the friction lowers, unless the intake air amount is decreased, the ignition timing is excessively retarded so as to hold the engine speed NE at a target value, which makes unstable the combustion state of the engine. To avoid the combustion state from being unstable, the map is configured as described above.

Then, the process proceeds to a step 49, wherein the target intake air amount Gcyl_cmd is set to the above catalyst warmup value Gcyl_cmd_ast. After that, the steps 44 and 45 are carried out, as described hereinabove, followed by terminating the present process.

Figure 14:
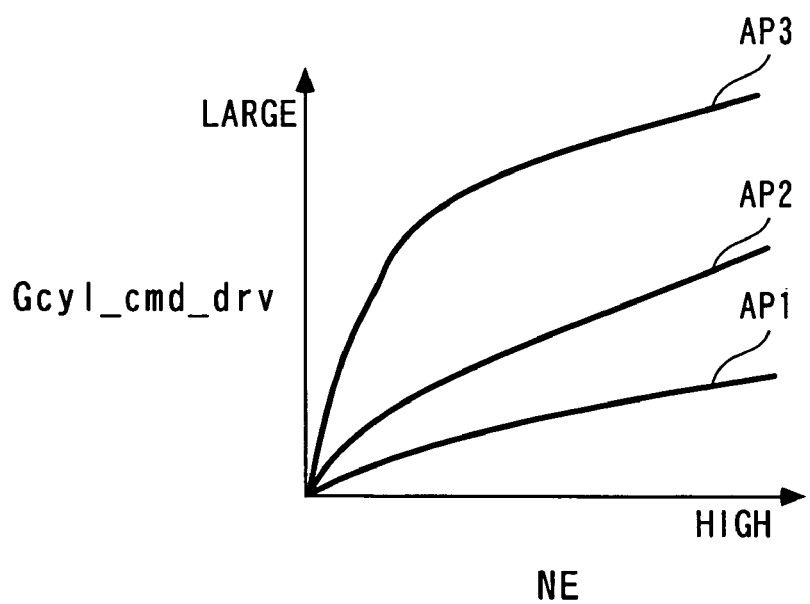
FIG. 14 is a diagram showing a map for use in calculating a normal time value Gcyl_cmd_drv of the target intake air amount, by way of example.

On the other hand, if the answer to the question of the step 46 or 47 is negative (NO), i.e. if the accelerator pedal is stepped on, or if Tast≧Tastlmt holds, the process proceeds to a step 50, wherein a normal time value Gcyl_cmd_drv of the target intake air amount is calculated by searching a map shown in FIG. 14 according to the engine speed NE and the accelerator pedal opening AP. In FIG. 14, AP1 to AP3 represent predetermined values of the accelerator pedal opening AP, between which the relationship of AP1<AP2<AP3 holds.

In this map, the normal time value Gcyl_cmd_drv is set to a larger value as the engine speed NE is higher, or as the accelerator pedal opening AP is larger. This is because as the engine speed NE is higher, or as the accelerator pedal opening AP is larger, the output power demanded of the engine 3 is larger, and hence a larger intake air amount is demanded.

Then, the process proceeds to a step 51, wherein the target intake air amount Gcyl_cmd is set to the above normal time value Gcyl_cmd_drv. After that, the steps 44 AND 45 are carried out, as described hereinabove, followed by terminating the present process.

On the other hand, if the answer to the question of the step 40 is affirmative (YES), i.e. if the variable valve lift mechanism 10 is faulty, the process proceeds to a step 52, wherein the lift control input Uliftin is set to a predetermined failure-time value Uliftin_fs, followed by terminating the present process.

Figure 15:
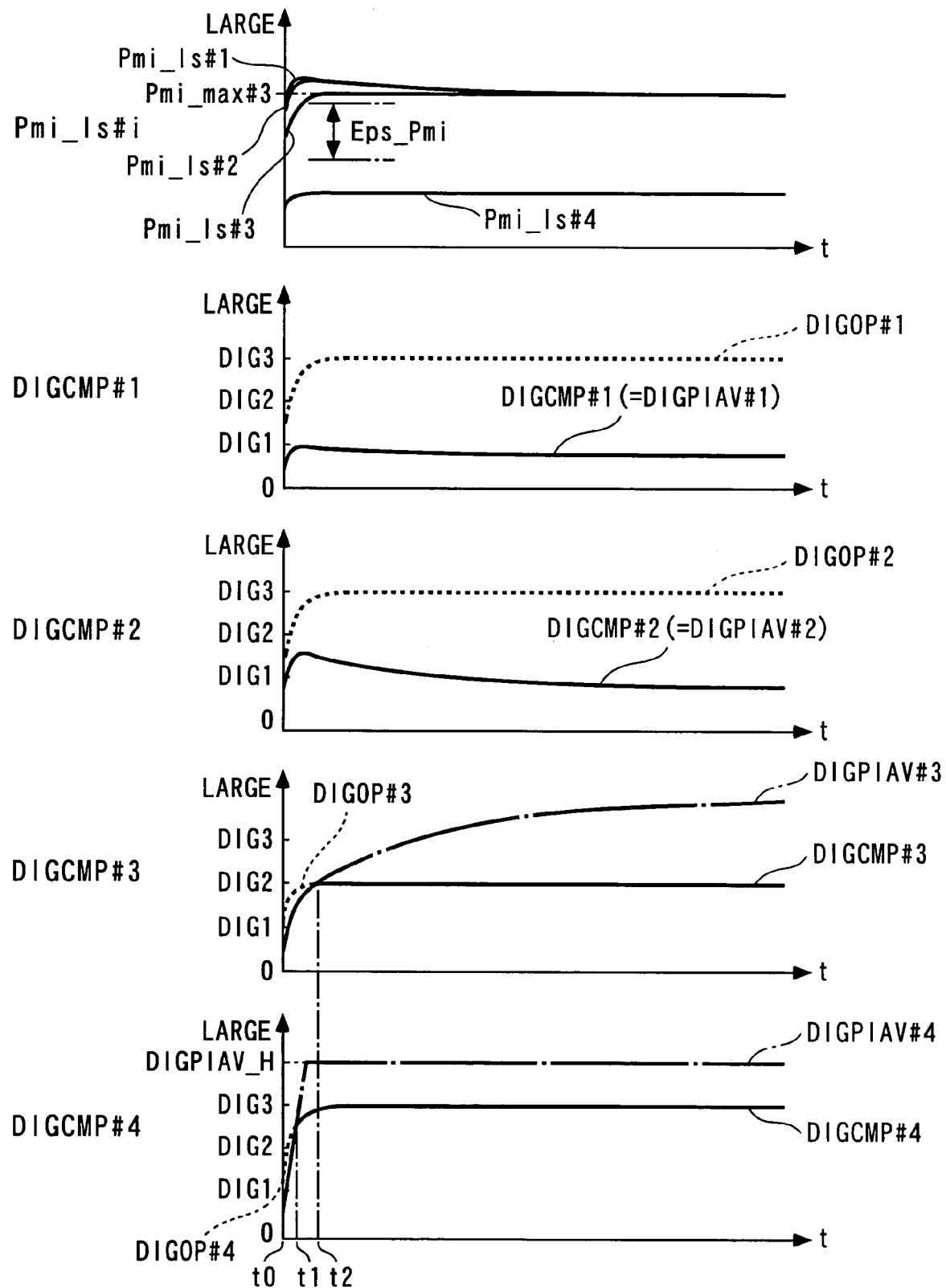
FIG. 15 is a timing diagram showing results of simulation of ignition timing control by the ignition timing control system, by way of example.

Next, a description will be given of the results of simulations of the ignition timing control (hereinafter referred to as "the control results") performed by the ignition timing control system 1 according to the present embodiment. FIG. 15 shows the control results obtained when the basic ignition timings IGBASE of the four cylinders •1 to •4 are held constant; the weighting coefficients w1 and w2 are set such that w1=0.2 and w2=0.8 hold; Pmi_ls•1>Pmi_ls•2>Pmi_ls•3>Pmi_ls•4 holds between the statistically processed values Pmi_ls•1 to Pmi_ls•4 of the four cylinders during a time period from the start of the control to the termination thereof; the statistically processed value Pmi_ls•3 of the third cylinder is set to the first reference value Pmi_ls_min1; and the statistically processed value Pmi_ls•2 of the second cylinder is set to the second reference value Pmi_ls_min2, that is, when Pmi_ls•3≧Pmi_ls•1−Eps_Pmi, and Pmi_ls•2≧Pmi_ls•1−Eps_Pmi hold.

Further, in FIG. 15, DIG1 to DIG3 represent predetermined values of the correction value DIGCMP•i, between which the relationship of DIG1<DIG2<DIG3 holds, and Pmi_max•3 a maximum value of the indicated mean effective pressure of the estimated MBT in the third cylinder •3, that is, a maximum value of the indicated mean effective pressure, which can be attained in the third cylinder •3.

As is clear from FIG. 15, first, in the fourth cylinder •4, as described hereinabove, the smoothing target value Piav_cmd is calculated by the weighted averaging expressed by the equation (4), whereby the smoothing target value Piav_cmd is calculated as a value larger than the statistically processed value Pmi_ls•4 of the fourth cylinder •4, and therefore the smoothing correction value DIGPIAV•4 is calculated as a value which corrects the basic ignition timing IGBASE such that the basic ignition timing IGBASE is more advanced than the estimated MBT. Moreover, it is apparent that since the statistically processed value Pmi_ls•4 cannot reach the smoothing target value Piav_cmd, the smoothing correction value DIGPIAV•4 is held at the upper limit value DIGPIAV_H after a sudden increase of the same.

In the above case, during a time period from control start time t0 to time t1, DIGOP•4>DIGPIAV•4 holds due to the relationship between the speed of calculation of DIGPIAV•4 by the smoothing controller 33 and the speed of calculation of DIGOP•4 by the optimization controller 36, whereby the correction value DIGCMP•4 is set to the smoothing correction value DIGPIAV•4, whereas after time t2, since DIGOP•4<DIGPIAV•4 holds, the correction value DIGCMP•4 is set to the optimization correction value DIGOP•4. As a result, in the fourth cylinder •4, the ignition timing IGLOG•4 is controlled to the estimated MBT, and Pmi_ls•4 is caused to converge to the maximum value of the indicated mean effective pressure of the estimated MBT in the fourth cylinder •4.

Further, in the third cylinder •3, the smoothing target value Piav_cmd is calculated by the weighted averaging expressed by the equation (4), whereby the smoothing target value Piav_cmd is set to a value slightly larger than the statistically processed value Pmi_ls•3 of the third cylinder •3, so that during a time period from the control start time t0 to time t2, DIGOP•3>DIGPIAV•3 holds, whereby the correction value DIGCMP•3 is set to the smoothing correction value DIGPIAV•3. Further, after the time t2, since DIGOP•3<DIGPIAV•3 holds, the correction value DIGCMP•3 is set to the optimization correction value DIGOP•3. As a result, in the third cylinder •3, the ignition timing IGLOG•3 is controlled to the estimated MBT, and the statistically processed value Pmi_ls•3 is caused to converge to the maximum value Pmi_max•3.

On the other hand, in the second cylinder •2, the smoothing target value Piav_cmd is calculated by the weighted averaging expressed by the equation (4), whereby the smoothing target value Piav_cmd is set to a value smaller than the statistically processed value Pmi_ls•2 of the second cylinder •2. Therefore, since DIGOP•2>DIGPIAV•2 always holds, the correction value DIGCMP•2 is set to the smoothing correction value DIGPIAV•2. As a result, in the second cylinder •2, the ignition timing IGLOG•2 is controlled to a more retarded value than that of the estimated MBT, and the statistically processed value Pmi_ls•2 is caused to converge to the maximum value Pmi_max•3.

Similarly, in the first cylinder •1 as well, DIGOP•1>DIGPIAV•1 always holds for the above-described reason, and hence the correction value DIGCMP•1 is set to the smoothing correction value DIGPIAV•1. As a result, in the first cylinder •1 as well, the ignition timing IGLOG•1 is controlled to a more retarded value than that of the estimated MBT, and the statistically processed value Pmi_ls•1 is caused to converge to the maximum value Pmi_max•3.

As described above, according to the ignition timing control system 1 of the present embodiment, the smoothing correction value DIGPIAV•i is calculated as a correction value for controlling the ignition timing IGLOG•i such that the statistically processed values Pmi_ls•1 to Pmi_ls•4 of the indicated mean effective pressure of all the cylinders are caused to follow one smoothing target value Piav_cmd, and the ignition timing IGLOG•i is corrected using the smoothing correction value DIGPIAV•i, whereby the ignition timing IGLOG•i can be controlled such that variation in the combustion state, that is, variation in heat generated by combustion between the cylinders is eliminated. This makes it possible to prevent variation in the engine speed and vibrations from being caused by variation in combustion state between the cylinders. The above-described advantages can be obtained more effectively, especially when the ignition timing control system 1 is applied to the engine 3 in which variation in the combustion state is liable to be caused due to the provision of the variable valve lift mechanism 10 therein.

Further, since the smoothing target value Piav_cmd is calculated as a weighted average value of the first and second reference values Pmi_ls_min1 and Pmi_ls_min2, which are statistically processed values of the indicated mean effective pressure of two cylinders, it is possible to avoid the smoothing target value Piav_cmd from being set to a value largely deviated from the statistically processed values Pmi_ls•1 to Pmi_ls•4 of all the cylinders, thereby making it possible to enhance follow-up performance of the statistically processed values Pmi_ls•i to the smoothing target value Piav_cmd, and avoid occurrence of variation in the engine speed. This makes it possible to enhance drivability.

Furthermore, the first and second reference values Pmi_ls_min1 and Pmi_ls_min2 for use in calculation of the smoothing target value Piav_cmd are set to the minimum value and the second minimum value of the statistically processed values Pmi_ls•i, which satisfy the relationship of Pmi_ls•i>Pmi_ls_max−Eps_Pmi. Therefore, even when there exists a cylinder in which Pmi_ls•i<Pmi_ls_max−Eps_Pmi holds, that is, even when there exists a cylinder which is much more degraded in combustion state than the other cylinders, the ignition timing IGLOG•i can be controlled with respect to the statistically processed values Pmi_ls•i of two cylinders more excellent in combustion state than the degraded cylinder, such that the variation in the combustion state can be eliminated. As a result, differently from the case where the smoothing target value Piav_cmd is calculated based on the cylinder which is much more degraded in combustion state than the other cylinders, it is possible to prevent an increase in the temperature of exhaust gases and occurrence of misfires, thereby making it possible to prevent the exhaust system and the catalyst from being damaged.

Further, the statistically processed value Pmi_ls•i is calculated by performing the predetermined sequential statistical process [equations (2) and (3)] on the estimated value Pmi_act•i calculated based on the in-cylinder pressure Pcyl•i, and hence can be calculated as a value which is difficult to be adversely affected by variation in the in-cylinder pressure Pcyl•i, that is, a value in which adverse influence of noise caused by the variation is suppressed, whereby the ignition timing can be controlled using the statistically processed value Pmi_ls•i calculated as above. Consequently, the adverse influence of noise caused by the variation in the in-cylinder pressure Pcyl•i can be suppressed, thereby making it possible to enhance the accuracy of control of the ignition timing IGLOG•i.

Furthermore, the optimization correction value DIGOP•i is calculated as a correction value for controlling the ignition timing IGLOG•i of each cylinder •i to the estimated MBT; the correction value DIGCMP•i is calculated by performing the limiting process for setting the optimization correction value DIGOP•i to a limited value on the advanced side, on the smoothing correction value DIGPIAV•i; and the basic ignition timing IGBASE is corrected by the optimization correction value DIGOP•i, whereby the ignition timing IGLOG•i is determined. Therefore, in the ignition timing control of each cylinder, differently from the case where the ignition timing control for controlling the ignition timing IGLOG•i of each cylinder •i to the estimated MBT and the ignition timing control for causing the statistically processed value Pmi_ls•i to follow the smoothing target value Piav_cmd are carried out simultaneously, it is possible to prevent the interaction between the two ignition timing control processes, and smoothly switch the correction value DIGCMP•i from the smoothing correction value DIGPIAV•i to the optimization correction value DIGOP•i. This makes it possible to avoid occurrence of a torque step to thereby enhance drivability.

Furthermore, the correction value DIGCMP•i is calculated by performing the limiting process for setting the optimization correction value DIGOP•i to a limited value on the advanced side, on the smoothing correction value DIGPIAV•i, and therefore even when the smoothing correction value DIGPIAV•i is set to a more advanced value than the optimization correction value DIGOP•i in any one of the cylinders, the correction value DIGCMP•i for the cylinder is limited to the optimization correction value DIGOP•i, whereby the ignition timing IGLOG•i is calculated based on the optimization correction value DIGOP•i. This makes it possible to control the ignition timing IGLOG•i of the cylinder to the estimated MBT, and control the statistically processed value Pmi_ls•i of the indicated mean effective pressure to its maximum value. In short, highest combustion efficiency can be ensured, thereby making it possible to further enhance drivability.

Further, as described above, the smoothing target value Piav_cmd is calculated as the weighted average value of the first and second reference values Pmi_ls_min1 and Pmi_ls_min2, and the correction value DIGCMP•i is determined as described hereinabove, so that in a cylinder for which the statistically processed value Pmi_ls•i is set to the first reference value Pmi_ls_min1, the correction value DIGCMP•i is set to the optimization correction value DIGOP•i, which increases the probability that the ignition timing IGLOG•i is controlled to the estimated MBT. As a result, the ignition timing IGLOG•i is controlled to the estimated MBT not only in the cylinder having the first reference value Pmi_ls_min1 set therefor but also in cylinders in which Pmi_ls•i<Pmi_ls_max−Eps_Pmi holds, whereby it is possible to enhance the combustion efficiency of the whole engine 3 more effectively.

Moreover, the smoothing correction value DIGPIAV•i is a value for controlling the ignition timing IGLOG•i of each cylinder such that all the four statistically processed values Pmi_ls•i follow the smoothing target value Piav_cmd, and hence when a cylinder for which the first reference value Pmi_ls_min1 is set is switched due to a change in the operating conditions of the engine 3, the smoothing target value Piav_cmd can be suddenly changed to suddenly change the smoothing correction value DIGPIAV•i as well. In view of this, according to the ignition timing control system 1, the smoothing correction value DIGPIAV•i is calculated with the control algorithm [equations (5) to (10)] including the two-degree-of-freedom control algorithm [equations (5) to (9)] in which the target value filter algorithm [equation (9)] and the sliding mode control algorithm [equations (5) to (8)] are combined. Therefore, by properly setting the filter characteristics of the target value filter algorithm, even when the smoothing target value Piav_cmd is suddenly changed, it is possible to avoid a sudden change in the smoothing correction value DIGPIAV•i. This makes it possible to avoid occurrence of a torque step caused by a sudden change in the smoothing correction value DIGPIAV•i, thereby making it possible to further enhance drivability.

It should be noted that the method of calculating the correction value DIGCMP•i is not limited to the method of using the aforementioned equations (31) and (32), but the following method may be employed: In the cylinder for which the statistically processed value Pmi_ls•i is set to the second reference value Pmi_ls_min2, and in a cylinder having the statistically processed value Pmi_ls•i larger than the above statistically processed value Pmi_ls•i set therefor, the correction value DIGCMP•i is set to the smoothing correction value DIGPIAV•i, as expressed by the following equation (44):

$$DIGCMP•i(k)=DIGPIAV•i(k) \qquad (44)$$

On the other hand, in cylinders other than the above-described cylinders, i.e. in the cylinder for which the statistically processed value Pmi_ls•i is set to the first reference value Pmi_ls_min1, and in a cylinder having a statistically processed value Pmi_ls•i larger than the above statistically processed value Pmi_ls•i set therefor, the correction value DIGCMP•i is set to the optimization correction value DIGOP•i, as expressed by the following equation (45):

$$DIGCMP\text{•}i(k)=DIGOP\text{•}i(k) \quad (45)$$

Figure 16:
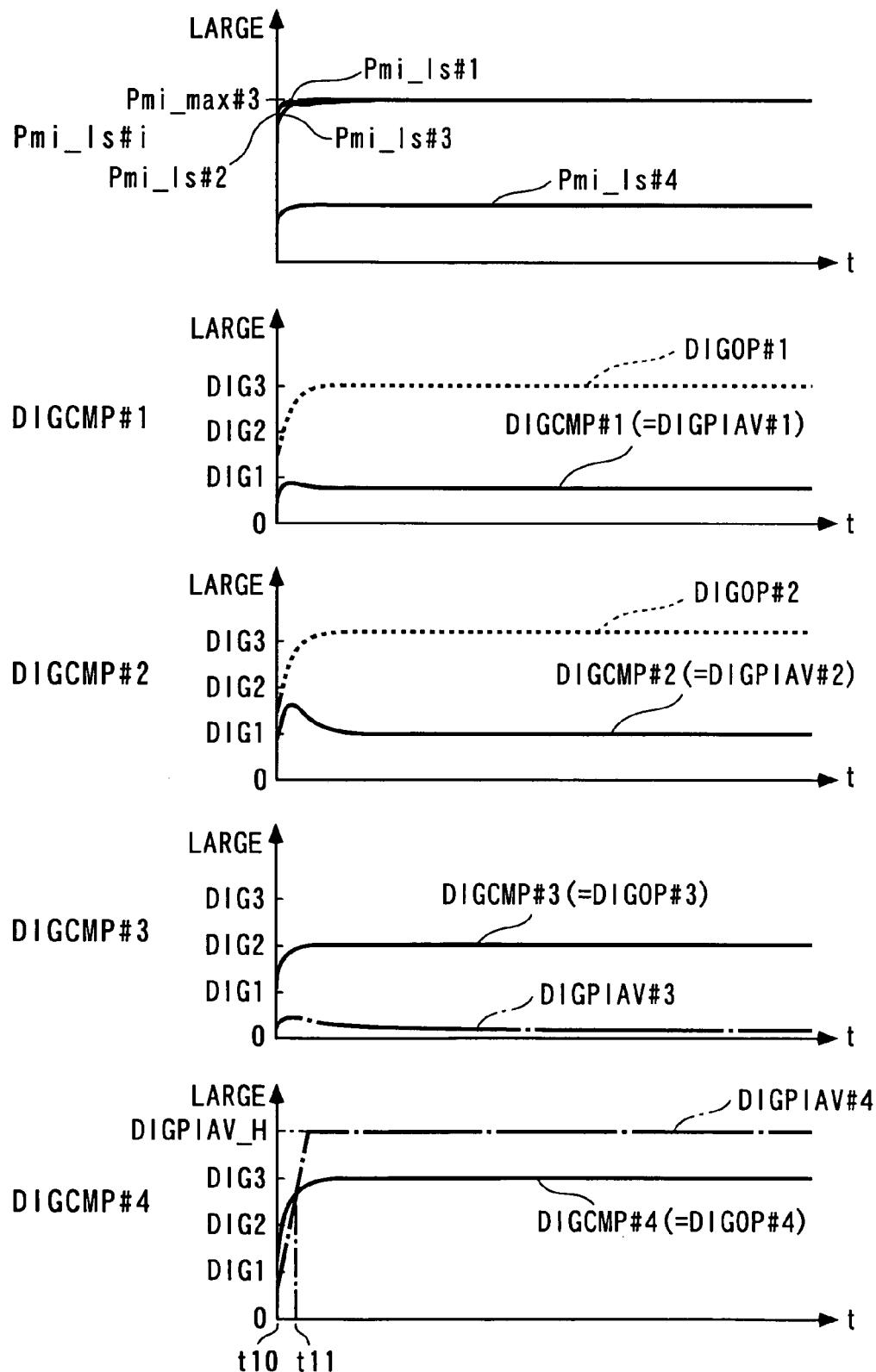
FIG. 16 is a timing diagram showing results of simulation of ignition timing control by a variation of the ignition timing control system, by way of example.

Next, a description will be given of the results of a simulation of the ignition timing control (hereinafter referred to as "the control results"), obtained when the correction value DIGCMP•i is calculated by the above method. FIG. 16 shows an example of the control results by the above method, in which the basic ignition timing IGBASE of the four cylinders •1 to •4, the weighting coefficients w1 and w2, and the statistically processed values Pmi_ls•1 to Pmi_ls•4 are set similarly to the example of the above-mentioned embodiment. Further, FIG. 17 shows an example of the control results, for comparison with the example illustrated in FIG. 16, in which in the control method of controlling the ignition timing, according to the present embodiment, the target value response-specifying parameter R_piav for use in the statistically processed values Pmi_ls•1 to Pmi_ls•3 is set to a value very close to a value of 0, whereby the follow-up speed at which the statistically processed value Pmi_ls•i follows the smoothing target value Piav_cmd is intentionally extremely increased.

Figure 17:
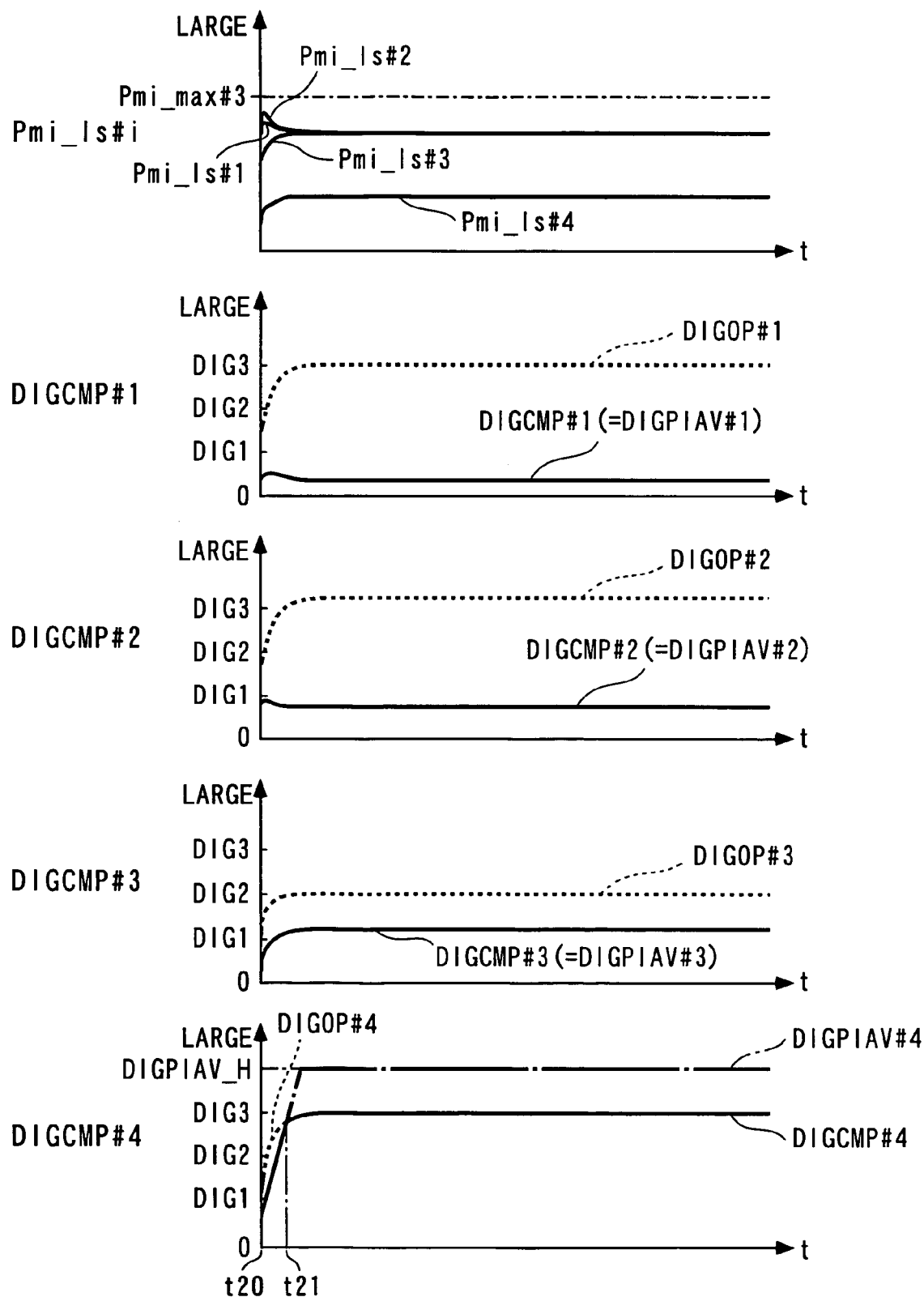
FIG. 17 is a timing diagram showing results of simulation of ignition timing control by a comparative example of the ignition timing control system, by way of example.

First, referring to the comparative example of the control results shown in FIG. 17, it is apparent that although in the fourth cylinder •4, similarly to the example of the control results shown in FIG. 15, the ignition timing IGLOG•4 is controlled to the estimated MBT, and the statistically processed value Pmi_ls•4 is caused to converge to the maximum value of the indicated mean effective pressure of the estimated MBT in the fourth cylinder •4, the statistically processed values Pmi_ls•1 to Pmi_ls•3 for the cylinders other than the fourth cylinder •4 are caused to converge to values lower than the maximum value Pmi_max•3 of the indicated mean effective pressure, which can be attained by the third cylinder •3. This is because the follow-up speed at which the statistically processed value Pmi_ls•i follows the smoothing target value Piav_cmd is extremely increased, as described hereinabove, so that the statistically processed values Pmi_ls•1 to Pmi_ls•3 for the first to third cylinders are smoothed in a state where the optimization correction value DIGOP•3 for the third cylinder •3 remains lower than the smoothing correction value DIGPIAV•3. In the smoothing controller 33, such a state occurs when the follow-up speed at which the statistically processed value Pmi_ls•i follows the smoothing target value Piav_cmd is extremely increased, and hence the state also occurs e.g. when the weighting coefficients w1 and w2 are set to improper values between which the relationship of w1>>w2 holds.

In contrast, in the example of the control results shown in FIG. 16, although in the fourth cylinder •4, DIGOP•4≧DIGPIAV•4 holds during a time period between control start time t10 and time t11, and DIGOP•4<DIGPIAV•4 holds after the time t11, the correction value DIGCMP•4 is held at the optimization correction value DIGOP•4, as expressed by the aforementioned equation (45), so that similarly to the example illustrated in FIG. 15, the ignition timing IGLOG•3 is controlled to the estimated MBT, and Pmi_ls•4 is caused to converge to the maximum value of the indicated mean effective pressure of the estimated MBT in the fourth cylinder •4.

Further, in the third cylinder •3 as well, the correction value DIGCMP•3 is held at the optimization correction value DIGOP•3, and hence similarly to the example shown in FIG. 15, the ignition timing IGLOG•3 is controlled to the estimated MBT, and the statistically processed value Pmi_ls•3 is caused to converge to the maximum value Pmi_max•3 of the indicated mean effective pressure of the estimated MBT in the third cylinder •3.

On the other hand, it is apparent that in the first and second cylinders, the correction values DIGCMP•1 and DIGCMP•2 are held at the smoothing correction values DIGPIAV•3 and DIGPIAV•4, respectively, and the statistically processed value Pmi_ls•1 and Pmi_ls•2 converge to the maximum value Pmi_max•3 of the indicated mean effective pressure, which can be attained by the third cylinder •3. In short, it is apparent that the combustion efficiency of the whole engine 3 is effectively enhanced.

As described hereinabove, also in the variation using the equations (44) and (45), it is possible to obtain the same advantageous effects as provided by the ignition timing control system 1 according to the above-described embodiment. It should be noted in the above variation, when a cylinder for which the statistically processed value Pmi_ls•i is set to the first reference value Pmi_ls_min1, and a cylinder for which the statistically processed value Pmi_ls•i is set to the second reference value Pmi_ls_min2 are switched due to a change in the operating conditions of the engine 3, the correction value DIGCMP•i is suddenly switched between the smoothing correction value DIGPIAV•i and the optimization correction value DIGOP•i. This can cause a small torque step, differently from the control method according to the above-described embodiment.

It should be noted that in the above embodiment, the in-cylinder pressure sensor 22 is used as the in-cylinder pressure-detecting means, by way of example, the in-cylinder pressure-detecting means is not necessarily limited to this, but it may be any suitable in-cylinder pressure-detecting means which is capable of detecting the in-cylinder pressure Pcyl•i.

Further, although in the above-described embodiment, the statistically processed value Pmi_ls•i of the indicated mean effective pressure is used as a work-done-amount parameter, by way of example, the work-done-amount parameter is not necessarily limited to this, but it may be any suitable value which is calculated according to the in-cylinder pressure, and represents the amount of work done in combustion in the cylinders. For example, an indicated output and the amount of generated heat may be used, or the estimated value Pmi_act•i of the indicated mean effective pressure may be directly used, as the work-done-amount parameter.

Furthermore, although in the above-described embodiment, the first and second reference values Pmi_ls_min1 and Pmi_ls_min2 are used as reference values, and the smoothing target value Piav_cmd is calculated by weighted averaging of these values, by way of example, the method of calculating the smoothing target value Piav_cmd is not necessarily limited to this, but it may be any suitable method of calculating the smoothing target value Piav_cmd, which uses one of the statistically processed values Pmi_ls•i as the reference value, and calculates the smoothing target value Piav_cmd according to the one statistically processed value. For example, when the minimum value of the four statistically processed values Pmi_ls•i is smaller than a value (Pmi_ls_max−Eps_Pmi), the minimum value may be set to the reference value and the smoothing target value Piav_cmd may be calculated according to the minimum value. Further, the smoothing target value Piav_cmd may be calculated by weighted averaging of the minimum value and the second minimum value.

Further, although in the above embodiment, the sliding mode control algorithm [equations (5) to (9)] is used as the predetermined follow-up control algorithm, by way of example, the predetermined follow-up control algorithm is not necessarily limited to this, but it may be any suitable control algorithm which controls the statistically processed value Pmi_ls•i such that it is caused to follow the filtered value Piav_cmd_f of the smoothing target value. For example, as the follow-up control algorithm, another response-specifying control algorithm, such as a back-stepping control algorithm may be used, or a general feedback control algorithm, such as a PID control algorithm, may be used.

Moreover, although in the above embodiment, the ignition timing control system according to the present invention is applied to a four-cylinder internal combustion engine, by way of example, this is not limitative, but the ignition timing control system according to the present invention can be applied to multi-cylinder internal combustion engines with two or more cylinders.

Further, although in the above embodiment, the ignition timing control system according to the present invention is applied to an internal combustion engine for a vehicle, by way of example, this is not limitative, but the ignition timing control system according to the present invention can be applied to general-purpose internal combustion engines. For example, the ignition timing control system according to the present invention can be applied to internal combustion engines for boats, electric generators, and so forth.

It is further understood by those skilled in the art that the foregoing is a preferred embodiment of the invention, and that various changes and modifications may be made without departing from the spirit and scope thereof.

What is claimed is:

1. An ignition timing control system for an internal combustion engine, comprising:
    in-cylinder pressure-detecting means for detecting pressures in a plurality of cylinders as a plurality of in-cylinder pressures, respectively;
    work-done-amount parameter-calculating means for calculating a plurality of work-done-amount parameters indicative of amounts of work done in combustion in the cylinders, according to the detected in-cylinder pressures, respectively;
    target value-calculating means for setting one of the calculated work-done-amount parameters to a reference value of the work-done-amount parameters, and calculating one target value as a target of the work-done-amount parameters, according to the reference value; and
    ignition timing-determining means for determining ignition timings of the cylinders, respectively, such that the work-done-amount parameters follow the one target value,
    wherein, the reference value is set to a minimum value of work-done-amount parameters within a range defined between the maximum value of the work-done-amount parameters as an upper limit and a value of the work-done-amount parameters smaller than the maximum value by a predetermined value, as a lower limit.

2. An ignition timing control system as claimed in claim 1, wherein the one target value is calculated according to the minimum value.

3. An ignition timing control system as claimed in claim 1, wherein said work-done-amount parameter-calculating means calculates unprocessed values of the work-done-amount parameters according to the in-cylinder pressures, respectively, and performs a predetermined sequential statistical process on the unprocessed values, to thereby calculate the work-done-amount parameters.

4. An ignition timing control system as claimed in claim 1, wherein said ignition timing-determining means comprises:
    first control value-calculating means for calculating a first control value for control of the ignition timing of each of the cylinders, such that in each cylinder, the work-done-amount parameter of the cylinder becomes maximum;
    second control value-calculating means for calculating a second control value for control of each of the cylinders, such that in each cylinder, the work-done-amount parameter of the cylinder follows the one target value;
    final control value-calculating means for calculating a final control value by performing a limiting process which sets the first control value to a limit value on an advanced side, on the second control value; and
    ignition timing-calculating means for calculating the ignition timing for each of the cylinders according to the calculated final control value.

5. An ignition timing control system as claimed in claim 4, wherein said target value-calculating means calculates the one target value by weighted averaging of the reference value and a value larger than the reference value of the work-done-amount parameters.

6. An ignition timing control system as claimed in claim 1, wherein said ignition timing-determining means comprises:
    first control value-calculating means for calculating a first control value for control of the ignition timing of each of the cylinders, such that in each cylinder, the work-done-amount parameter of the cylinder becomes maximum;
    second control value-calculating means for calculating a second control value for control of each of the cylinders, such that in each cylinder, the work-done-amount parameter of the cylinder follows the one target value; and
    ignition timing-calculating means for calculating ignition timings of ones of the cylinders, of which work-done-amount parameters are not larger than the reference value, according to the first control value, and ignition timings of ones of the cylinders, of which work-done-amount parameters are larger than the reference value, according to the second control value.

7. An ignition timing control system as claimed in claim 4 or 6, wherein said second control value-calculating means calculates the second control value according to a control algorithm including a two-degree-of-freedom control algorithm in which a predetermined target value filter algorithm and a predetermined follow-up control algorithm are combined.

* * * * *